United States Patent
Kameoka et al.

(10) Patent No.: US 11,874,117 B2
(45) Date of Patent: Jan. 16, 2024

(54) VEHICLE POSITIONING DEVICE

(71) Applicant: Mitsubishi Electric Corporation, Tokyo (JP)

(72) Inventors: Shota Kameoka, Tokyo (JP); Rin Shinomoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 391 days.

(21) Appl. No.: 17/424,897

(22) PCT Filed: Apr. 4, 2019

(86) PCT No.: PCT/JP2019/014930
§ 371 (c)(1),
(2) Date: Jul. 22, 2021

(87) PCT Pub. No.: WO2020/202522
PCT Pub. Date: Oct. 8, 2020

(65) Prior Publication Data
US 2022/0082390 A1 Mar. 17, 2022

(51) Int. Cl.
*G01C 21/28* (2006.01)
*G01C 21/00* (2006.01)
(Continued)

(52) U.S. Cl.
CPC ......... *G01C 21/28* (2013.01); *G01C 21/3848* (2020.08); *G01S 19/42* (2013.01); *G01S 13/88* (2013.01); *G01S 17/88* (2013.01)

(58) Field of Classification Search
CPC .......................... G01C 21/28; G01C 21/3848; G01C 21/3841; G01C 21/3819; G01S 19/42;
(Continued)

(56) References Cited

U.S. PATENT DOCUMENTS

| 2010/0004856 | A1 | 1/2010 | Kobori et al. |
| 2016/0070265 | A1* | 3/2016 | Liu .................. B64C 39/024 701/25 |
| 2020/0150279 | A1* | 5/2020 | Miyajima .............. G01S 19/49 |

FOREIGN PATENT DOCUMENTS

| JP | 2005-265494 A | 9/2005 |
| JP | 2005-313803 A | 11/2005 |

(Continued)

OTHER PUBLICATIONS

International Search Report and Written Opinion dated Jul. 2, 2019, received for PCT Application PCT/JP2019/014930, Filed on Apr. 4, 2019, 11 pages including English Translation.
(Continued)

*Primary Examiner* — Donald J Wallace
(74) *Attorney, Agent, or Firm* — XSENSUS LLP

(57) ABSTRACT

The present invention is related to a vehicle positioning device being connected to a first sensor outputting satellite positioning data, and a second sensor detecting a state amount of a vehicle and outputting the state amount as state amount data, and being connected to at least one of a third sensor detecting a terrestrial object and outputting data of a relative relationship between the terrestrial object and the vehicle, and a fourth sensor detecting a road line shape and outputting road line shape data. The vehicle positioning device includes: observed value processing circuitry configured to generate an actual observed value; sensor correction circuitry; inertial positioning circuitry; and observed value prediction circuitry configured to predict an observed value and output the observed value as a predicted observed value. Positioning calculation is performed by using the predicted observed value and the actual observed value and results are output as positioning results.

14 Claims, 12 Drawing Sheets

(51) Int. Cl.
*G01S 19/42* (2010.01)
*G01S 13/88* (2006.01)
*G01S 17/88* (2006.01)

(58) Field of Classification Search
CPC .......... G01S 13/88; G01S 17/88; G01S 13/91; G01S 17/931; G01S 19/49
See application file for complete search history.

(56) References Cited

FOREIGN PATENT DOCUMENTS

| JP | 2008-2906 A | 1/2008 |
|---|---|---|
| JP | 2008-249639 A | 10/2008 |
| JP | 2016-170124 A | 9/2016 |

OTHER PUBLICATIONS

Koyama et al., "Dynamic Map Maintenance in Autonomous Driving", Special Issue of "Realization and Utilization of Social IoT by Dynamic Map", System/Control/Information, vol. 60, No. 11, 2016, pp. 463-468 (13 pages including English Translation).

* cited by examiner

F I G. 6
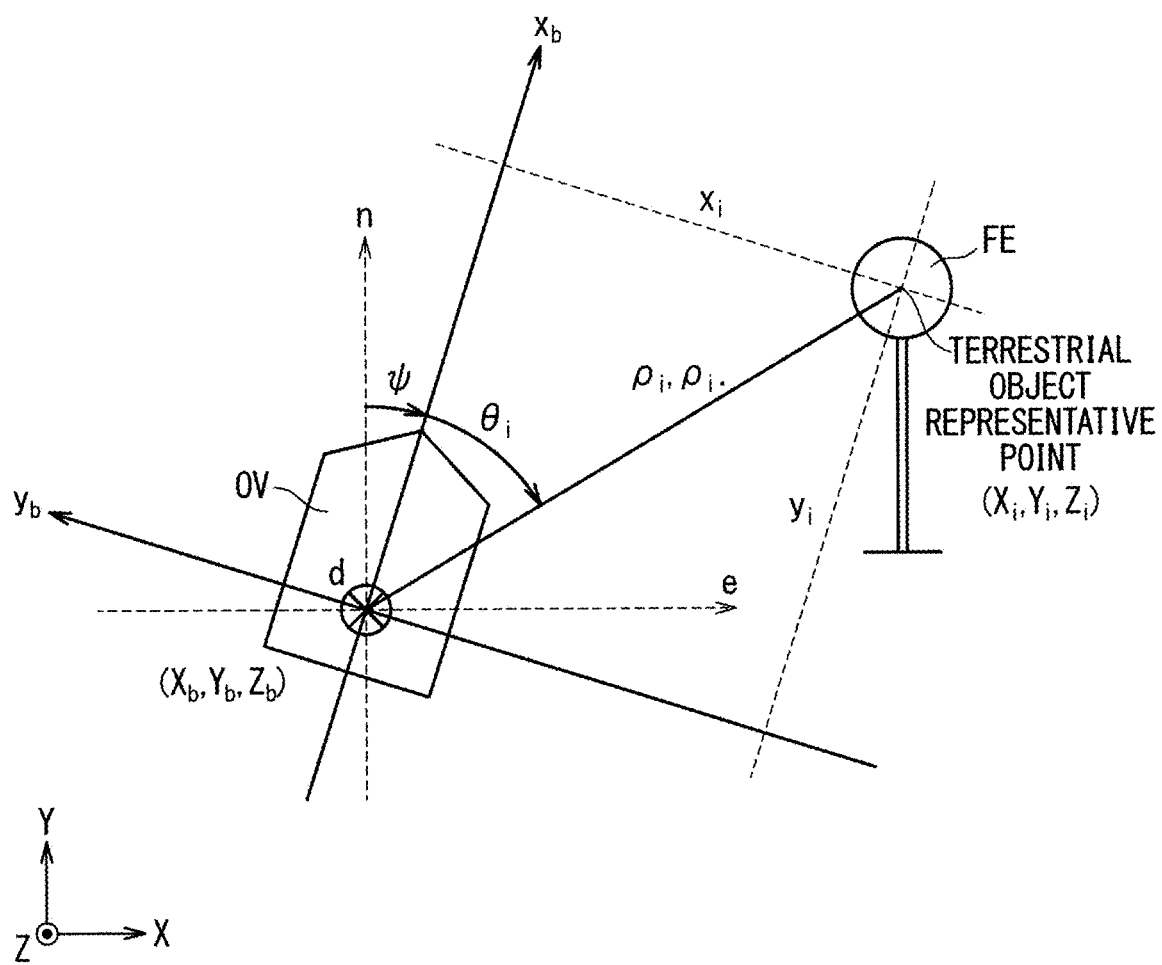

… (1)

VEHICLE POSITIONING DEVICE

CROSS-REFERENCE TO RELATED APPLICATION

The present application is based on PCT filing PCT/JP2019/014930, filed Apr. 4, 2019, the entire contents of which are incorporated herein by reference.

TECHNICAL FIELD

The present invention relates to a vehicle positioning device that is mounted on a vehicle and that positions a position of the vehicle, and more particular to a vehicle positioning device that is not easily affected by a radio wave state of a satellite.

BACKGROUND ART

Related art proposes a vehicle positioning device that corrects output of an inertial sensor in which errors are biased on positioning results of inertial positioning by using satellite positioning results obtained from a Global Navigation Satellite System (GNSS) so as to enhance positioning accuracy of a vehicle. With such a technology, accuracy of inertial positioning can be enhanced by performing positioning at times when bias errors of the inertial sensor can be captured with a satellite, and even when a satellite cannot be captured, such as when a vehicle exists in an indoor location or in a tunnel, positioning accuracy can be maintained. For example, paragraph [0007] of Patent Document 1 discloses that the object is to obtain a seamless and high-accuracy positioning technology regardless of an indoor or outdoor location by using an indoor Global Positioning System (GPS) for indoor use in addition to satellite positioning.

PRIOR ART DOCUMENTS

Patent Documents

Patent Document 1: Japanese Patent Application Laid-Open No. 2016-170124

SUMMARY

Problem to be Solved by the Invention

In the vehicle positioning technology of the related art, positioning can be continued even in an indoor location in which a satellite cannot be captured; however, there is a problem in that positioning accuracy cannot be maintained when a satellite positioning signal is significantly deteriorated even if a satellite can be captured. Examples of such a case include positioning in an urban area where multipath, in which radio waves from satellites reflect on structures such as buildings and reach a GNSS antenna through a plurality of paths, is liable to be caused, in a mountainous area where radio wave strength from satellites reduces due to trees, and the like.

The present invention is made in order to solve the problems as described above, and has an object to provide a vehicle positioning device in which positioning accuracy can be maintained and situations where positioning can be continued are increased.

Means to Solve the Problem

A vehicle positioning device according to the present invention is a vehicle positioning device being mounted on a vehicle and positioning a position of the vehicle. The vehicle positioning device is connected to a first sensor outputting satellite positioning data, and a second sensor detecting a state amount of the vehicle and outputting the state amount as state amount data, and is connected to at least one of a third sensor detecting a terrestrial object and outputting data of a relative relationship between the terrestrial object and the vehicle, and a fourth sensor detecting a road line shape and outputting road line shape data. The vehicle positioning device includes: observed value processing circuitry configured to receive the satellite positioning data and at least one of the data of the relative relationship and the road line shape data, and generate an actual observed value by integrating the received pieces of data; sensor correction circuitry configured to correct a sensor error included in the state amount data, the sensor correction circuitry being connected to the second sensor; inertial positioning circuitry configured to perform inertial positioning by using a corrected sensor value corrected in the sensor correction circuitry and output results as inertial positioning results; observed value prediction circuitry configured to predict an observed value by using at least the inertial positioning results and output the observed value as a predicted observed value; and a filter configured to perform positioning calculation by using the predicted observed value and the actual observed value and output results as positioning results, and estimate the sensor error and output the sensor error as a sensor correction amount. The filter feeds back the sensor correction amount to the sensor correction circuitry. The sensor correction circuitry corrects the sensor error by using the sensor correction amount.

Effects of the Invention

According to the vehicle positioning device of the present invention, even in situations where multipath is liable to be caused, positioning accuracy can be maintained, and situations where positioning can be continued can be increased.

BRIEF DESCRIPTION OF DRAWINGS

FIG. 6 is a diagram illustrating a relative positional relationship with a terrestrial object.

DESCRIPTION OF EMBODIMENTS

Introduction

In the embodiments described below, a terrestrial object includes a road sign, a traffic light, a utility pole, and the like, road information includes node data, a traffic lane width, inclination data, and the like related to a road, an autonomous sensor is a sensor that detects a state amount of a vehicle itself installing a vehicle positioning device according to the embodiment and includes a vehicle speedometer, an accelerometer, an angular velocity meter, and the like, an external sensor is a sensor that detects information related to an environment in which the vehicle installing the vehicle positioning device according to the embodiment exists and includes a laser rangefinder, a camera, and a radar, a road line shape is a shape of a road, and road line shape data includes information of a variety of combinations of a straight line and a curve line, the degree of inclination, and the like.

First Embodiment

<Device Configuration: Outline>

Figure 1:
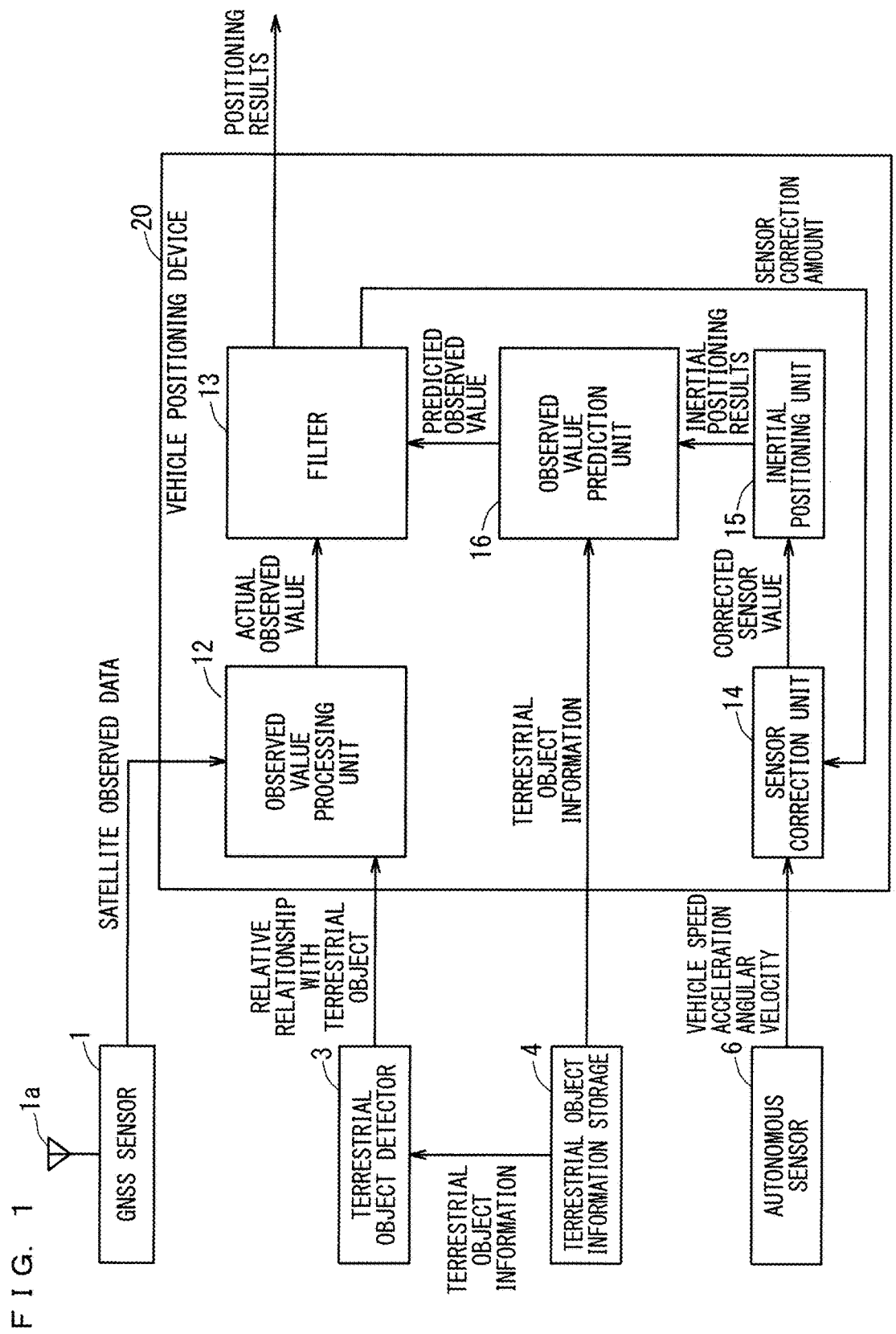
FIG. 1 is a functional block diagram illustrating a configuration of a vehicle positioning device of the first embodiment according to the present invention.

FIG. 1 is a functional block diagram illustrating a configuration of a vehicle positioning device 20 of the first embodiment according to the present invention. As illustrated in FIG. 1, a GNSS sensor 1 (first sensor) and a terrestrial object detector 3 (third sensor) are connected to the vehicle positioning device 20 as external sensors, and the vehicle positioning device 20 detects external information around the vehicle. Further, a terrestrial object information storage 4 and an autonomous sensor 6 (second sensor) are connected to the vehicle positioning device 20.

The vehicle positioning device 20 includes an observed value processing unit 12, a filter 13, a sensor correction unit 14, an inertial positioning unit 15, and an observed value prediction unit 16.

The observed value processing unit 12 has a function of receiving data of a relative relationship between satellite observed data output from the GNSS sensor 1 and a terrestrial object output from the terrestrial object detector 3, calculating an actual observed value necessary for performing positioning calculation and estimation of a correction amount of state amount data output by the autonomous sensor 6, and outputting the results to the filter 13.

The sensor correction unit 14 has a function of correcting a scale factor error and a bias error of the autonomous sensor 6, and outputting the results to the inertial positioning unit 15 as a corrected sensor value.

The inertial positioning unit 15 has a function of performing inertial positioning calculation of a position, an orientation, velocity, and the like being positioning results of the vehicle by using the corrected sensor value input from the sensor correction unit 14, and outputting the results to the observed value prediction unit 16 as inertial positioning results.

The observed value prediction unit 16 has a function of calculating a predicted observed value necessary for positioning calculation and estimation of a correction amount of state amount data output by the autonomous sensor by using the inertial positioning results input from the inertial positioning unit 15 and terrestrial object information input from the terrestrial object information storage 4, and outputting the results to the filter 13.

The filter 13 has a function of positioning calculation and estimating a sensor error of the autonomous sensor 6 by using the actual observed value input from the observed value processing unit 12 and a predicted observed value predicted by the observed value prediction unit 16. The sensor error estimated by the filter 13 is fed back to the sensor correction unit 14 as a sensor correction amount. Further, the results of positioning calculation in the filter 13 are output of the vehicle positioning device 20 as positioning results. Note that, if data cannot be obtained from the external sensor, the filter 13 outputs the inertial positioning results output from the inertial positioning unit 15 as output of the vehicle positioning device 20.

Further, in the filter 13, although the sensor correction amount is estimated at timing when data is obtained from the external sensor, the value is stored, and thus even when data cannot be obtained from the external sensor, sensor correction can be performed, and positioning accuracy can be maintained.

According to the vehicle positioning device 20 having the configuration as described above, when data is obtained from any one of the GNSS sensor 1 and the terrestrial object detector 3, positioning calculation and calculation of the sensor correction amount can be performed, and positioning accuracy can be maintained. In addition, when data is obtained from both of the GNSS sensor 1 and the terrestrial object detector 3, positioning results having higher reliability can be output.

Further, the actual observed value obtained by using data from the GNSS sensor 1 and the terrestrial object detector 3 and the predicted observed value obtained by using data from the autonomous sensor 6 are merged by the filter 13, and thus there is no need for switch operation of selecting one of the actual observed value and the predicted observed value. Therefore, an unpreferable phenomenon such as positioning leaping where positioning results become discontinuous at the time of switching can be reduced.

Further, the use of a plurality of external sensors allows for processing of, when some external sensor outputs an abnormal value, probabilistically determining the abnormal value and not using the abnormal value for positioning calculation. As a result, reliability of positioning calculation can be maintained.

Further, an update cycle of a sensor value of an external sensor is generally a low cycle, that is, generally as low as 10 Hz, and thus when positioning with a high cycle is required, the requirement cannot be satisfied only with the external sensor. In contrast, the autonomous sensor can obtain a sensor value with a high cycle, that is, generally as high as 100 Hz, and can thus execute inertial positioning with the cycle. Therefore, in the vehicle positioning device 20, an effect that positioning results can be acquired with a high cycle can also be obtained in comparison to when only the sensor value of the external sensor is used.

Figure 2:
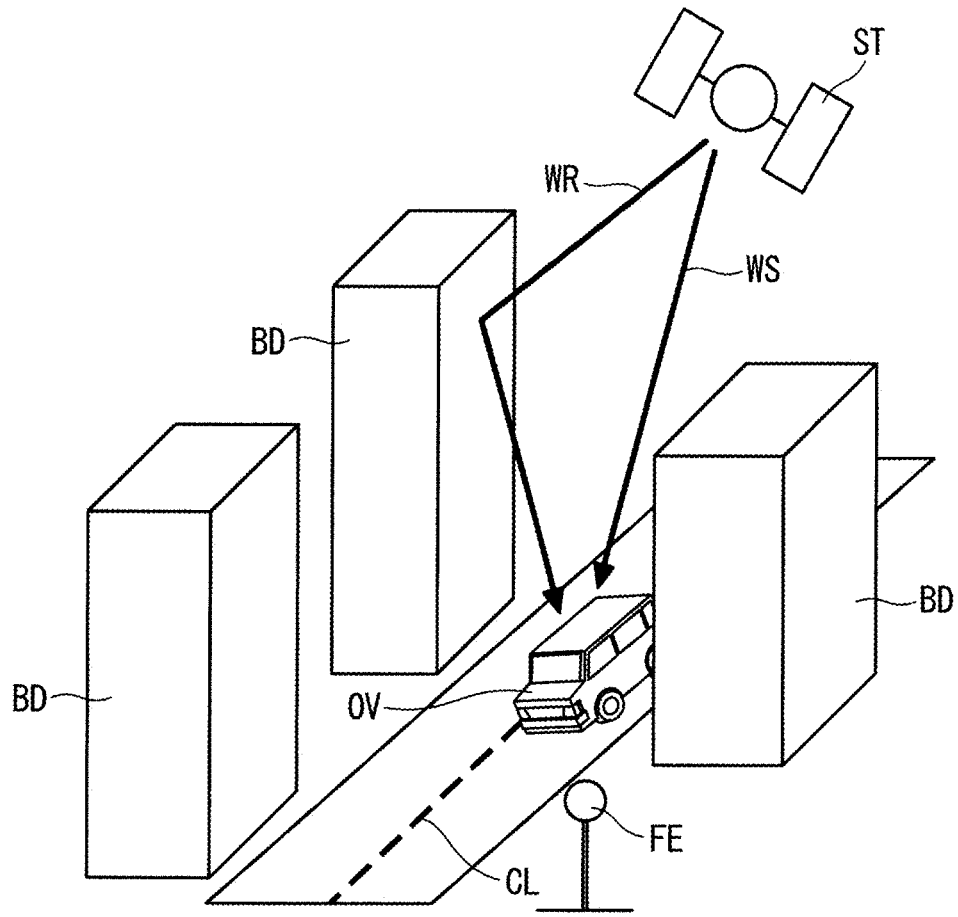
FIG. 2 is a diagram illustrating positioning under a multipath environment.

FIG. 2 is a diagram schematically illustrating an example in which satellite positioning accuracy deteriorates when a satellite can be captured. As illustrated in FIG. 2, in a location where there are a plurality of buildings BD in an urban area and its suburban area, there is a case where a reflected radio wave WR, which is a radio wave from the satellite ST reaching a vehicle OV after reflecting a structure such as the building BD, and a directly reaching radio wave WS, which is a radio wave from the satellite ST directly reaching the vehicle OV, are simultaneously received. When satellite positioning is performed in such a situation, generally, there is a problem in that positioning accuracy is significantly deteriorated, and positioning accuracy of satellite positioning cannot be maintained. In the technology disclosed in Japanese Patent Application Laid-Open No. 2016-170124, solving the problem is difficult.

In contrast, according to the vehicle positioning device 20, positioning accuracy can be maintained by using data of a relative relationship with a terrestrial object even in a situation as illustrated in FIG. 2. Specifically, by integrating information that can be observed by the vehicle OV such as a mark line CL and a terrestrial object FE besides the GNSS sensor 1, situations in which positioning can be performed can be increased.

As an example of a positioning device using terrestrial object information, there is technology disclosed in Japanese Patent Application Laid-Open No. 2005-265494. In the vehicle positioning estimation device proposed in the above document, terrestrial objects and white lines are detected with an on-board camera, and positioning is thereby performed. However, at times when the terrestrial objects and white lines are not detected, the position is estimated by using only a vehicle speedometer, and thus a road line shape having a curve line shape cannot be handled, and also a sensor error is not estimated depending on a terrestrial object and a white line, and thus when the vehicle speedometer has an error, the errors of the sensor are accumulated, which results in causing deterioration of positioning accuracy.

In contrast, in the vehicle positioning device 20, at times when external information by the external sensor can be observed, a sensor error is estimated, and at times when the external information cannot be observed, the sensor error estimated at times when the external information can be observed is used. In this manner, accuracy of inertial positioning can be maintained.

In recent years, preparation of a digital map for distributing high-resolution, static, and dynamic information for automated driving of vehicles has been carried out worldwide, which is referred to as a dynamic map in Japan. One reference document thereof is dynamic map preparation in automated traveling (system/control/information, Vol. 60, No. 11 pp. 463-468, 2016).

Figure 3:
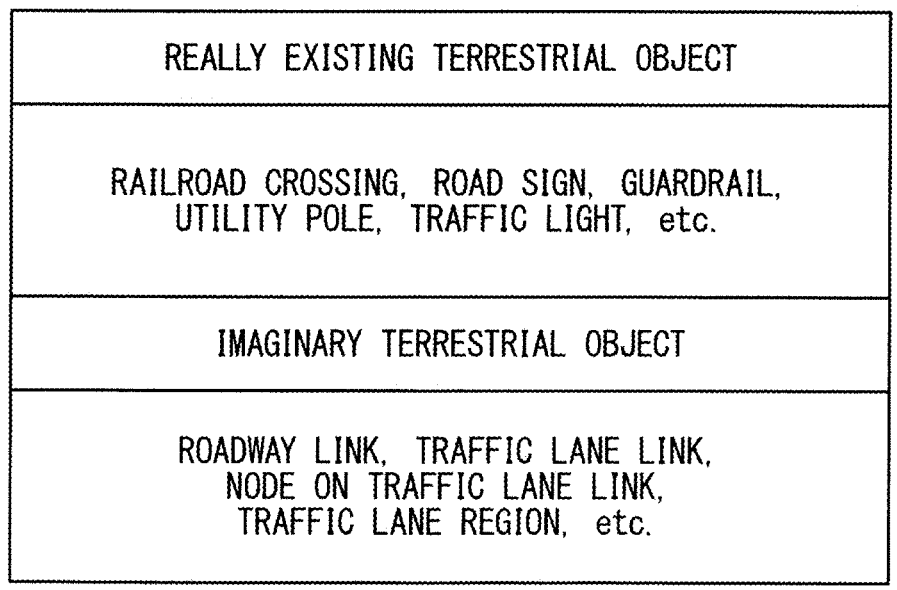
FIG. 3 is a diagram illustrating static information of a digital map.

The above reference document describes a concept as to what sort of information the dynamic map distributes. FIG. 3 illustrates an example of information of terrestrial objects distributed as static information in the dynamic map described in the above reference document. In FIG. 3, as static information, absolute position information of really existing terrestrial objects that really exist on a road such as a railroad crossing, a road sign, a guardrail, a utility pole, and a traffic light, and map information such as road center coordinates are incorporated. Further, as an imaginary terrestrial object created based on the really existing terrestrial object, information of a roadway link, a traffic lane link, a node on the traffic lane link, a traffic lane region, and the like is incorporated.

Note that the roadway refers to a boundary line whose boundary is physically limited such as a wall, a guardrail, and a curb, and a terrestrial object having a height limitation such as a tunnel and a cave entrance. Further, the boundary line of a traffic lane is limited by a mark line (a white line or the like) of a passing zone.

In the vehicle positioning device 20, the dynamic map can be applied as a database of the terrestrial object information storage 4.

Distribution of the digital map including the dynamic map has been studied worldwide and has been standardized in the International Organization for Standardization (ISO) and the like, and will thus be used worldwide as a standard.

<Device Configuration: Detail>

Individual function blocks of the vehicle positioning device 20 will be described in detail.

<GNSS Sensor>

A GNSS antenna 1a is connected to the GNSS sensor 1. The GNSS sensor 1 can acquire various pieces of observed data from a satellite by receiving positioning signals from positioning satellites orbiting on a satellite orbit with the GNSS antenna 1 and performing signal processing on the received positioning signals.

The GNSS sensor 1 may have a function of outputting, as positioning raw data, observed data of the GNSS before performing positioning calculation as well as positioning calculation results subjected to positioning calculation in the GNSS sensor 1 depending on settings of output. The positioning raw data includes a pseudorange observed value, a Doppler observed value, and a carrier wave phase observed value, and these observed values are obtained for each frequency band in which the satellite distributes (for example, L1 band, L2 band, L5 band, and the like).

The positioning satellite includes Global Navigation Satellite System (GLONASS) from Russia, Galileo from the European Union, Quasi-Zenith Satellite System (QZSS) from Japan, Beidou from China, Navigation Indian Constellation (NavIC) from India, and the like as well as GPS from the United States, and the vehicle positioning device of the first to third embodiments according to the present invention can be applied to all of these.

For positioning calculation in the GNSS sensor 1, any one of positioning methods of point positioning, Differential GPS (DGPS) positioning, Real time Kinematic (RTK) positioning, network-type RTK positioning, and the like can be performed. Further, usually, the GNSS sensor 1 can output reliability information of the positioning calculation results.

Point positioning is a type of satellite positioning method in which positioning is performed by using pseudorange observed values received from four or more positioning satellites.

DGPS positioning is a positioning method in which satellite positioning results with higher accuracy in comparison to point positioning can be obtained by performing positioning calculation using satellite positioning error augmented data that can be generated from a stationary satellite-type satellite navigation augmentation system (satellite-based augmentation system (SBAS)), an electronic reference point, and a private fixed station.

RTK positioning is a positioning method in which high-accuracy satellite positioning is enabled by transferring satellite raw data of an electronic reference point and a private fixed station to a mobile station, and removing a satellite positioning error factor near a base station. In RTK positioning, positioning can be performed with centimeter-level accuracy when an integer variable referred to as ambiguity is obtained with high reliability. A positioning solution in this case is referred to as a Fix solution, and when ambiguity is not obtained, a Float solution is output.

Network-type RTK positioning is a positioning method in which high-accuracy positioning is performed by acquiring satellite positioning data corresponding to base station installation by using a network.

Some GNSS sensors 1 can calculate absolute velocity in three axial directions of the GNSS antenna 1a with respect to the earth, for example, north, east, and vertical directions by using a Doppler observed value and satellite navigation data as well as absolute position information such as latitude, longitude, and altitude. With the use of the absolute velocity information, a direction, specifically, an azimuth, in which the GNSS antenna 1a moves can be detected. Note that the satellite positioning method that can be applied to the vehicle positioning device of the first to third embodiments according to the present invention includes all the satellite positioning methods other than the methods described above.

<Terrestrial Object Detector>

The terrestrial object detector 3 has a function of detecting a terrestrial object by using a peripheral recognition camera attached to the vehicle, Light Detection and Ranging (LiDAR) also referred to as a laser rangefinder, a radar, and the like, and outputting a relative relationship between the terrestrial object existing around the vehicle and the vehicle and indication details of the terrestrial object as terrestrial object detection results.

The relative relationship between the terrestrial object and the vehicle indicates relative distance relationship, a relative velocity relationship, and the like with terrestrial object representative points (points) associated with coordinate information of a map database from a navigation center (for example, the center in the rear axis) of the vehicle in a vehicle navigation coordinate system.

Figure 4:
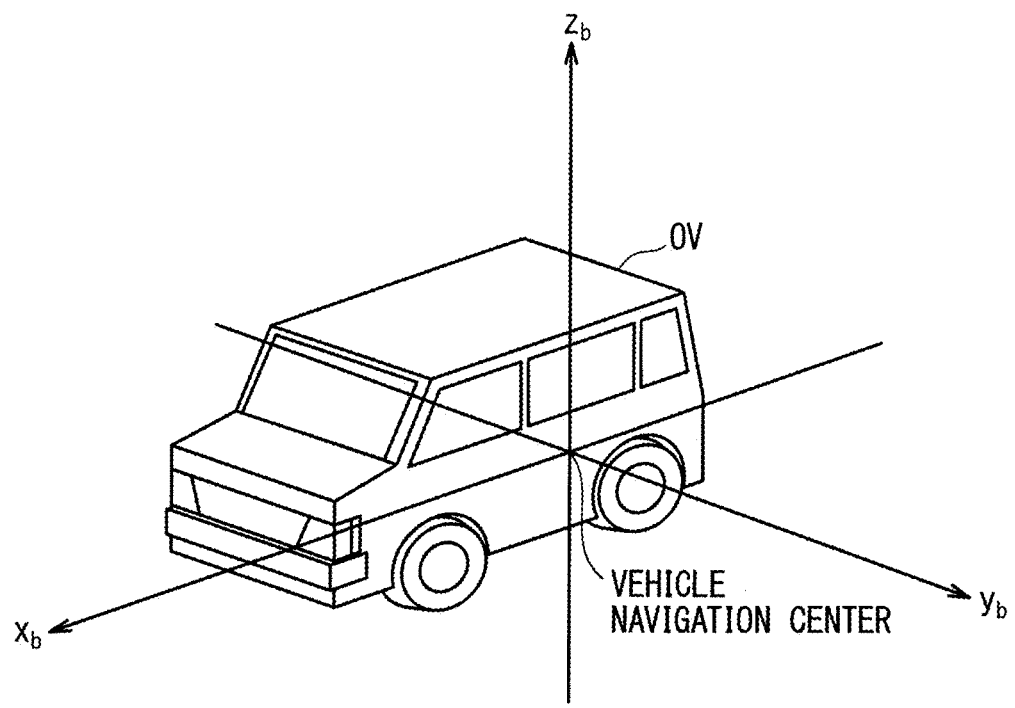
FIG. 4 is a diagram illustrating a vehicle navigation coordinate system.

For the vehicle navigation coordinate system, for example, as illustrated in FIG. 4, a coordinate system in which the zb-axis is taken so as to satisfy the right-hand rule with the xb-axis and the yb-axis is often used, with the origin being the navigation center of the vehicle OV, here the center in the rear axis, the xb-axis representing the front direction of the vehicle, and the yb-axis representing the left direction.

In addition, the terrestrial object detector 3 can output information related to the terrestrial object associated with the relative relationship between the terrestrial object and the vehicle by referring to a terrestrial object database of the terrestrial object information storage 4 storing terrestrial object information related to the terrestrial object and combining with the detection results of the terrestrial object detector 3.

The terrestrial object information related to the terrestrial object refers to a terrestrial object type such as a utility pole, a road sign, and a guardrail, absolute position coordinates, and indication details. Specifically, the terrestrial object detector 3 can simultaneously output a distance to the terrestrial object defined in the vehicle coordinate system, velocity, a type of the terrestrial object, absolute position coordinates, indication details, and the like.

The GNSS sensor 1 and the terrestrial object detector 3 being external sensors have detection targets different from each other, and thus situations in which detection can be performed are different from each other. For example, in a situation in which a satellite cannot be captured by the GNSS sensor 1, such as in a tunnel, the GNSS sensor 1 cannot obtain the observed value. Further, the terrestrial object detector 3 cannot output detection results in a zone where there are no terrestrial objects.

<Observed Value Processing Unit>

The observed value processing unit 12 has a function of integrally processing the observed value obtained from the GNSS sensor 1 and the relative relationship between the terrestrial object and the vehicle obtained from the terrestrial object detector 3, and transmitting the results to the filter 13 as an actual observed value.

<Sensor Correction Unit>

The sensor correction unit 14 has a function of correcting sensor data obtained from the autonomous sensor 6 by using the sensor correction amount estimated in the filter 13.

<Autonomous Sensor>

The autonomous sensor 6 includes sensors for positioning a position, velocity, and orientation of the vehicle, such as a vehicle speedometer that measures vehicle speed of the vehicle, an inertial measurement device (inertial measurement unit (IMU)) that measures acceleration and angular velocity of the vehicle, and a steering angle meter that measures a steering angle of the vehicle.

The vehicle speedometer is attached to a wheel of the vehicle, and has a function of converting into vehicle speed of the vehicle by using output from a pulse sensor that detects rotation velocity of the wheel.

The IMU is installed on the roof of the vehicle or inside the vehicle, and has a function of detecting acceleration and angular velocity in the vehicle coordinate system. As the IMU, for example, IMUs incorporating a micro electric mechanical system (MEMS) and an optical fiber gyro (fiber optic gyroscope), or the like are commercially available.

<Inertial Positioning Unit>

The inertial positioning unit 15 has a function of positioning the position, velocity, and orientation of the vehicle, based on vehicle speed and acceleration of the vehicle and an integrated value of the angular velocity sensor by using the sensor value of the autonomous sensor 6 corrected by the sensor correction unit 14 and an operation model of the vehicle.

In the inertial positioning unit, positioning is performed by integrating the sensor values acquired from the autonomous sensor 6 from moment to moment, based on the operation model of the vehicle. Usually, the sensor value of the autonomous sensor 6 includes a scale factor error, a bias error, and the like, and this is integrated from moment to moment, and thus there is a problem that accuracy of the inertial positioning deteriorates over time.

In contrast, with the vehicle positioning device of the first to third embodiments according to the present invention, the sensor errors are estimated by the filter, and the sensor value of the autonomous sensor 6 is corrected as the sensor correction amount, and thus accuracy of the inertial positioning can be enhanced.

<Observed Value Prediction Unit>

The observed value prediction unit 16 has a function of calculating the predicted observed value by using the inertial positioning results and the terrestrial object information around the vehicle with respect to the actual observed value calculated and processed in the observed value processing unit 12, and outputting the results to the filter 13.

<Filter>

The filter 13 has a function of performing positioning calculation of the position, velocity, orientation, and the like and further estimating sensor errors of the autonomous sensor 6 such as a scale factor error and a bias error by estimating probabilistically the most likely state amount by using the actual observed value obtained from the observed value processing unit 12 and the predicted observed value obtained from the observed value prediction unit 16.

Here, the state amount is the position, velocity, orientation of the vehicle in the three-dimensional direction, and the sensor errors of the autonomous sensor 6, and the like. The positioning calculation results estimated in the filter 13 are output from the vehicle positioning device 20 as the positioning results, and the sensor errors are input to the sensor correction unit 14 as the sensor correction amount.

<Operation>

Next, an overall processing flow of the vehicle positioning device 20 will be described with reference to the flowchart illustrated in FIG. 5. When the vehicle positioning device 20 starts positioning, first, the initial value of inertial positioning and the current inertial positioning results used in the observed value prediction unit 16 are acquired (Step S100).

Note that, when the current inertial positioning results cannot be acquired, such as immediately after power of the vehicle positioning device 20 is turned on, roughly calculated positioning results acquired from the GNSS sensor 1 can be used, and a value that is predetermined as the initial value of inertial positioning can be used.

Next, the vehicle positioning device 20 determines whether data is obtained from the external sensors such as the GNSS sensor 1 and the terrestrial object detector 3 (Step S101). The external sensors have detection targets different from each other. If there is at least one sensor that obtains a sensor value (in a case of Yes), the processing proceeds to Step S102, otherwise (in a case of No), the processing proceeds to Step S131.

If the vehicle positioning device 20 cannot obtain data from the external sensor, in Step S131, the vehicle positioning device 20 outputs inertial positioning results calculated in inertial positioning calculation of Step S113 to be described later as positioning results of the vehicle positioning device 20.

In Step S102, the observed value processing unit 12 processes the sensor value obtained in the external sensor so as to be used by the filter 13 in the next Step S103, and outputs the results as an actual observed value.

Here, processing for the observed value obtained in each of the GNSS sensor 1 and the terrestrial object detector 3 in the observed value processing unit 12 will be described.

<Processing for Observed Value in GNSS Sensor>

In the first embodiment, the GNSS sensor 1 outputs coordinate information of latitude, longitude, altitude, and azimuth in the phase center of the GNSS antenna 1a, and their respective reliabilities. Usually, transmission is performed from the GNSS sensor 1 with the protocol defined in the National Marine Electronics Association (NMEA). However, output specifications are different depending on a manufacturer. Thus, in the observed value processing unit 12, the sensor values obtained in the GNSS sensor 1 regarding latitude, longitude, and azimuth are converted into a unit system such as deg or rad, and the sensor value regarding altitude is converted into a unit system such as m (meter).

<Processing for Observed Value in Terrestrial Object Detector>

In the first embodiment, from the terrestrial object detector 3, absolute position coordinates of a representative point of a terrestrial object, for example, latitude, longitude, altitude information and a relative positional relationship between the vehicle navigation center and a terrestrial object representative point are obtained. Although there are various methods of expressing the relative positional relationship, here, as illustrated in FIG. 6, a relative distance and a relative azimuth from the navigation center of the vehicle OV to the terrestrial object representative point are used.

XYZ in FIG. 6 represents an absolute coordinate system, and in this case represents an ECEF coordinate system (Earth Centered Earth Fixed coordinates) being a coordinate system fixed to the earth with the origin being the centroid of the earth. Coordinates (Xi, Yi, Zi) and coordinates (Xb, Yb, Zb) of FIG. 6 respectively represent absolute position coordinates of the terrestrial object FE and absolute position coordinates of the navigation center of the vehicle OV. Note that zi is not illustrated in the figure. Further, the axis n, the axis e, and the axis d of FIG. 6 represent a coordinate system in which coordinate axes are taken in the north direction, the east direction, and the vertical direction, with the origin being the navigation center of the vehicle OV, which is also referred to as an NED coordinate system. Note that $\psi$ in the figure represents a vehicle azimuth in which the clockwise direction is regarded positive, with the north being a reference.

When output in the terrestrial object detector 3 is coordinates (xi, yi, zi) with respect to the terrestrial object FE, a relative distance $\rho_{m,i}$ and a relative azimuth $\theta_{m,i}$ are respectively calculated by the following expressions (1) and (2).

$$\rho_{m,i} = \sqrt{x_i^2 + y_i^2 + z_i^2} \tag{1}$$

$$\theta_{m,i} = \mathrm{atan}\left(\frac{x_i}{y_i}\right) \tag{2}$$

These pieces of information are output together with the coordinates (Xi, Yi, Zi) being coordinates of the terrestrial object representative point. Note that, here, only the relative distance and the relative azimuth are described. However, as the output of the terrestrial object detector 3, relative velocity information may be able to be output, and thus the relative velocity information may be used as the observed value. Further, only the relative azimuth is used in this case. However, a relative pitch angle, a relative roll angle, and the like can also be calculated from the coordinates (xi, yi, zi), and thus this can be added as the observed value. In this case, positioning of an orientation angle of the vehicle and the like can also be performed, and thus more advanced positioning can be performed. Here, the pitch angle and the roll angle are terms related to angles about the yb-axis and about the xb-axis illustrated in FIG. 4, respectively.

Here, the description returns back to the flowchart of FIG. 5, and the flow starting with Step S111 will be described.

The vehicle positioning device 20 acquires a sensor value from the autonomous sensor 6 in parallel with the determination of Step S101 (Step S111). Specifically, acceleration and angular velocity are acquired from the IMU, and vehicle speed information and the like are acquired from the vehicle speedometer.

<Correction of Sensor Value of Autonomous Sensor>

Next, in the sensor correction unit 14, the sensor value acquired from the autonomous sensor 6 is corrected (Step S112). The following will describe a case in which the vehicle speedometer and a yaw-axis direction angular velocity (hereinafter "yaw rate") sensor of the vehicle are used as the autonomous sensor 6, and correction is performed by using sensor error models as expressed in the following expression (3) and expression (4).

$$V = (1+s_v)V_t \tag{3}$$

V: SENSOR VALUE OF VEHICLE SPEED
$V_t$: TRUE VALUE OF VEHICLE SPEED
$s_v$: SCALE FACTOR OF VEHICLE SPEED $$\gamma = (1+s_\gamma)(\gamma_t + b_\gamma) \tag{4}$$

$\gamma$: YAW RATE SENSOR VALUE
$\gamma_t$: YAW RATE TRUE VALUE $s_\gamma$: SCALE FACTOR OF YAW RATE
$b_\gamma$: BIAS OF YAW RATE SENSOR Expression (3) is a model in which a scale factor $s_v$ of the vehicle speed is multiplied to a true value $V_t$ of the vehicle speed, and expression (4) is a model in which a bias $b_\gamma$ of a yaw rate sensor is added to a yaw rate true value $\gamma_t$ and a scale factor $s_\gamma$ of the yaw rate is multiplied thereto.

As will be described later, in this example, in the filter 13, estimated values $s_{ve}$, $s_{\gamma e}$, and $b_{\gamma e}$ of respective $s_v$, $s_\gamma$, and $b_\gamma$ are estimated as sensor errors. The sensor correction unit 14 corrects the sensor value of the autonomous sensor 6 according to the following expressions (5) and (6) by using the estimated values of the sensor errors.

[Expression 5]

$$V_e = \frac{1}{(1+s_{vc}) \cdot V} \quad (5)$$

[Expression 6]

$$\gamma_e = \frac{1}{(1+s_{\gamma e}) \cdot \gamma - b_{\gamma e}} \quad (6)$$

In expressions (5) and (6), $V_e$ and $\gamma_e$ are respectively the corrected vehicle speed and yaw rate. Note that the sensor error models described above are merely an example, and other sensor error models may be used.

<Processing in Inertial Positioning Unit>

Figure 5:
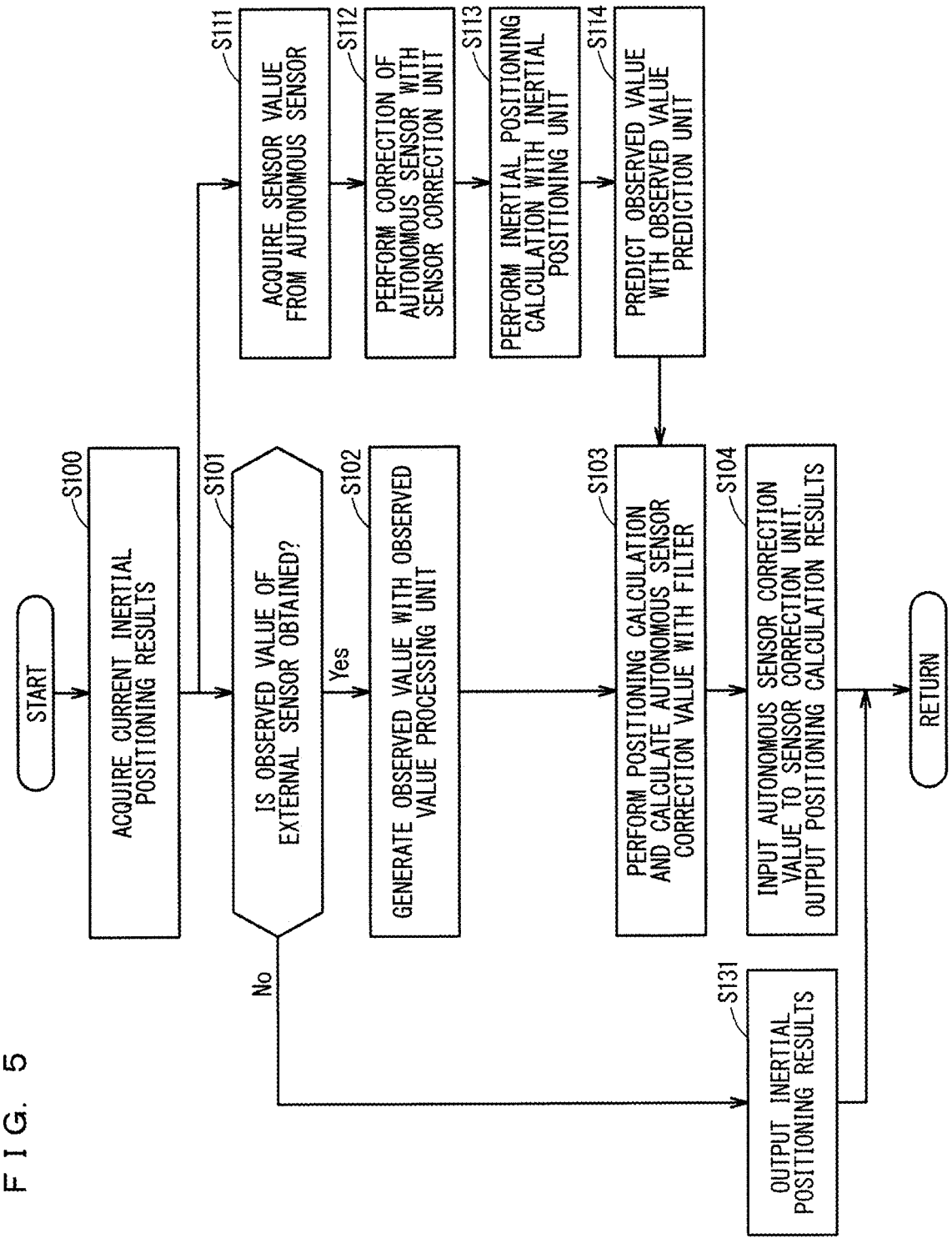
FIG. 5 is a flowchart illustrating an overall processing flow of the vehicle positioning device of the first embodiment according to the present invention.

Here, the description returns back to the flowchart of FIG. 5, and processing of Step S113 is performed. Specifically, inertial positioning calculation is performed in the inertial positioning unit 15 by using the corrected sensor value and the operation model of the vehicle. As a specific calculation method of inertial positioning calculation, modeling is carried out on the assumption that the vehicle roughly moves within a plane. Note that the following expression employs a navigation coordinate system in conformity to an ellipsoid of GRS 80 (Geodetic Reference System 1980). First, a state variable as expressed in the following expression (7) is defined.

$$y_d = [\lambda_d \; \varphi_d \; h_d \; \psi_d]^T \quad (7)$$

$y_d$ in expression (7) represents a state vector related to inertial positioning in which state variables related to inertial positioning are combined together. Further, $\lambda_d$ represents latitude obtained in inertial positioning calculation, pa represents longitude obtained in inertial positioning calculation, $h_d$ represents ellipsoid height obtained in inertial positioning calculation, and $\psi_d$ represents an azimuth obtained in inertial positioning calculation.

The state variable is modeled by an operation model as expressed by the following expression (8).

$$y_{d\cdot} = g(y_d, u) = \begin{bmatrix} \dfrac{V\cos\psi_d}{M+h_d} \\ \dfrac{V\sin\psi_d}{(N+h_d)\cos\lambda_d} \\ 0 \\ \gamma \end{bmatrix} \quad (8)$$

$\lambda_d$: LATITUDE BY INERTIAL POSITIONING [rad]
$\varphi_a$: LONGITUDE BY INERTIAL POSITIONING [rad]
$h_d$: ELLIPSOID HEIGHT BY INERTIAL POSITTIONING [m]
$\psi_d$: AZIMUTH BY INERTIAL POSITIONING (CLOCKWISE WITH REFERENCE TO NORTH) [rad]
V: VEHICLE SPEED [m/sec]
$\gamma$: YAW RATE [rad/sec]
a: EQUATORIAL RADIUS (=6378137.0 [m])
$F_e$: EARTH FLATTENING (=1/298.257223563)

$y_{d\cdot}$ in expression (8) represents a vector obtained by differentiating the state vector related to inertial positioning with respect to time. Further, $g(y_d, u)$ is a non-linear function in which $y_d$, u are used as input, and u is an input vector in which input variables V and $\gamma$ are combined together, and represents $u=[V\gamma]^T$.

Further, N in expression (8) represents a prime vertical radius, and M represents a meridian radius, which are respectively defined in the following expressions (9) and (10).

$$N = \frac{a}{(1-e^2\sin^2\lambda_d)^{1/2}} \quad (9)$$

$$e : \text{ECCENTRICITY} \left(= \sqrt{F_e(2-F_e)}\right)$$

$$M = \frac{a(1-e^2)}{(1-e^2\sin^2\lambda_d)^{3/2}} \quad (10)$$

By substituting the corrected sensor value into expression (8) and performing integration from moment to moment, the inertial positioning results can be obtained. As the method of integration, a method such as the Runge-Kutta method is often used. Note that coordinates such as latitude, longitude, and altitude of inertial navigation are used as coordinates of the navigation center of the vehicle.

Here, the description returns back to the flowchart of FIG. 5, and processing of Step S114 is performed. Specifically, with the use of the information obtained in inertial positioning, in the observed value prediction unit 16, the predicted observed value is calculated. Observed value prediction of the GNSS sensor 1 and observed value prediction of the terrestrial object detector 3 will be described below.

<Processing in Observed Value Prediction Unit>
<Prediction for Observed Value of GNSS Sensor>

The observed value obtained in the GNSS sensor 1 is coordinate information such as latitude, longitude, and altitude of the GNSS antenna 1a. In the following, the observed value of the GNSS sensor 1 is represented as ($\lambda_m$, $\varphi_m$, $h_m$, $\psi_m$). In contrast, the inertial positioning results can also obtain these pieces of coordinate information. However, the inertial positioning results are coordinates of the navigation center of the vehicle, and thus the observed value of the GNSS sensor 1 is predicted by using an offset amount from the vehicle navigation center to the position of the GNSS antenna 1a. Specifically, the predicted observed value ($\lambda_p$, $\varphi_p$, $h_p$, $\psi_p$) of the GNSS sensor 1 can be calculated as in the following expression (11) by using a coordinate conversion function $c(y_d, v)$, based on an inertial positioning value $y_d(\lambda_d, \varphi_d, h_d, \psi_d)$ and an offset amount v ($\Delta x$, $\Delta y$, $\Delta z$), where ($\Delta x$, $\Delta y$, $\Delta z$) represents the offset amount from the vehicle navigation center expressed in the navigation coordinate system of the vehicle to the GNSS antenna 1a.

$$\begin{bmatrix} \lambda_p \\ \varphi_p \\ h_p \\ \psi_p \end{bmatrix} = c(\lambda_d, \varphi_d, h_d, \psi_d, \Delta x, \Delta y, \Delta z) \quad (11)$$

<Prediction for Observed Value of Terrestrial Object Detector>

The observed value obtained in the terrestrial object detector 3 is a distance and an azimuth angle between the vehicle and the terrestrial object representative point. Using the inertial positioning results and the absolute position coordinates of the terrestrial object representative point, these observed values can be predicted. Specifically, when a predicted value of a distance and a relative angle between the vehicle and the representative point (Xi, Yi, Zi) of the terrestrial object FE are respectively represented by $\rho_{p,i}$ and $\theta_{p,i}$, these can be respectively calculated by the following expressions (12) and (13).

$$\rho_{p,i} = \sqrt{(X_i - X_d)^2 + (Y_i - Y_d)^2 + (Z_i - Z_d)^2} \quad (12)$$

$$\theta_{p,i} = \operatorname{atan}(e_i/n_i) - \psi_d \quad (13)$$

Here, $(X_d, Y_d, Z_d)$ of expression (12) represents $\lambda_d$, $\varphi_d$, and $h_d$ being inertial positioning results in the ECEF coordinate system, and can be calculated by the following expression (14).

$$\begin{bmatrix} X_d \\ Y_d \\ X_d \end{bmatrix} = \begin{bmatrix} (N + h_d)\cos\lambda_d \cos\varphi_d \\ (N + h_d)\cos\lambda_d \sin\varphi_d \\ (N(1 - e^2) + h_d)\sin\lambda_d \end{bmatrix} \quad (14)$$

Further, $e_i$ and $n_i$ in expression (13) represents the terrestrial object representative point in the NED coordinate system, and can be calculated by the following expression (15).

$$\begin{bmatrix} n_i \\ e_i \\ d_i \end{bmatrix} = \begin{bmatrix} -\sin\lambda_d \cos\varphi_d & -\sin\lambda_d \sin\varphi_d & \cos\lambda_d \\ -\sin\varphi_d & \cos\varphi_d & 0 \\ -\cos\lambda_d \cos\varphi_d & -\cos\lambda_d \sin\varphi_d & -\sin\lambda_d \end{bmatrix} \begin{bmatrix} X_i \\ Y_i \\ Z_i \end{bmatrix} \quad (15)$$

<Processing in Filter>

Here, the description returns back to the flowchart of FIG. 5, and processing of Step S103 will be described. In the filter 13, filter positioning calculation and estimation of errors of the autonomous sensor 6 are performed by using the actual observed value obtained in Step S102 and the predicted observed value obtained in Step S114 (Step S103).

First, a state vector expressed in the following expression (16) is defined, with variables being an estimation target being latitude, longitude, altitude, an azimuth, a vehicle speed scale factor, a yaw rate scale factor, and a yaw rate bias.

$$x = [\lambda \ \varphi \ h \ \psi \ s_v \ s_\gamma \ b_\gamma]^T \quad (16)$$

If the scale factor $s_v$ of the vehicle speed and the scale factor $s_\gamma$ of the yaw rate are minor, according to expressions (5) and (6), the true value $V_t$ of the vehicle speed and the true value $\gamma_t$ of the yaw rate can be respectively approximated according to the following expressions (17) and (18).

$$V_t = (1 - s_v)V \quad (17)$$

$$\gamma_t = (1 - s_\gamma)\gamma - b_\gamma \quad (18)$$

Dynamic models of the scale factor $s_v$ of the vehicle speed, the scale factor $s_\gamma$ of the yaw rate, and the bias $b_\gamma$ of the yaw rate sensor are respectively expressed in the following expressions (19), (20), and (21). Specifically, these are driven through a linear Markov process for predicting the next state from the current state.

$$s_{v.} = (-s_v + w_{sv})/\tau_{sv} \quad (19)$$

$w_{sv}$: PROCESS NOISE OF VEHICLE SPEED SCALE FACTOR [−]

$\tau_{sv}$: VEHICLE SPEED SCALE FACTOR MODEL PARAMETER VALUE [sec]

$$s_{\gamma.} = (-s_\gamma + w_{s\gamma})/\tau_{s\gamma} \quad (20)$$

$w_{s\gamma}$: PROCESS NOISE OF YAW RATE SCALE FACTOR [−]

$\tau_{s\gamma}$: YAW RATE SCALE FACTOR MODEL PARAMETER VALUE [sec]

$$b_{\gamma.} = (-b_\gamma + w_{b\gamma})/\tau_{b\gamma} \quad (21)$$

$w_{b\gamma}$: PROCESS NOISE OF YAW RATE BIAS [rad/sec]

$\tau_{b\gamma}$: YAW RATE BIAS MODEL PARAMETER VALUE [sec]

In expressions (19) to (21), $s_{v.}$ represents time differentiation of $s_v$, $s_{\gamma.}$ represents time differentiation of $s\gamma$, and $b_{\gamma.}$ represents time differentiation of $b_\gamma$. Further, process noise $Ws_v$ of the vehicle speed scale factor is noise related to time transition of the vehicle speed scale factor, process noise $Ws_\gamma$ of the yaw rate scale factor is noise related to time transition of the yaw rate scale factor, and process noise $Wb_\gamma$ of the yaw rate bias is noise related to time transition of the yaw rate bias.

To summarize expressions (19) to (21), the state equation can be expressed by the following expression (22).

$$x. = f(x, u) := \begin{bmatrix} \dfrac{(1 - s_v)V\cos\psi}{M + h} \\ \dfrac{(1 - s_v)V\sin\psi}{(N + h)\cos\lambda} \\ 0 \\ (1 - s_\gamma)\gamma - b_\gamma \\ -s_v/\tau_{sv} \\ -b_\gamma/\tau_{b\gamma} \end{bmatrix} \quad (22)$$

In expression (22), x. represents a vector obtained by differentiating a state vector x with respect to time. Further, u is an input vector that can be expressed by the following expression (23).

$$u = [V\gamma]^T \quad (23)$$

By estimating the state vector x with expression (22) as a state equation, expression (11) as an observation equation by the GNSS sensor 1, and expressions (12) and (13) as observation equations by terrestrial object detection, positioning calculation and estimation of the errors of the autonomous sensor 6 can be performed.

The state equation of expression (22) and the observation equations of expressions (11) to (13) are non-liner with respect to the state vector, and thus non-linear state estimation needs to be applied in order to perform positioning calculation and estimation of the errors of the autonomous sensor 6. As a method of non-liner state estimation, a particle filter referred to as the particle filter or the sequential Monte Carlo method, and a known method such as the extended Kalman filter can be applied. These methods are methods for estimating probabilistically the most likely state, and are often used in state estimation problems.

A method using the extended Kalman filter will be described below. In the Kalman filter, estimation of the state vector is performed under the assumption that noise accompanying the system follows the Gaussian distribution, and this is advantageous in implementation because a calculation load is small and only a small calculation circuit suffices in comparison to the particle filter.

<State Estimation by Extended Kalman Filter>

By performing linear Taylor expansion on expression (22) about a pre-estimated value xb of the state vector, it can be expressed by the following expression (24).

$$\delta \dot{x} = F_a \delta x + w \quad (24)$$

In expression (24), w is process noise, and δx is an error state vector that can be expressed by the following expression (25).

$$\delta x := x - x_b \quad (25)$$

Further, in expression (24), Fa can be expressed by the following expression (26).

$$F_a := \frac{\partial f}{\partial x}\bigg|_{x=x_b} \quad (26)$$

An observation equation $z_{GNSS}$ by the GNSS sensor 1 is expressed as in the following expression (27).

$$z_{GNSS} = [\lambda_p \, \varphi_p \, h_p \, \psi_p]^T \quad (27)$$

An observation equation $z_{land,i}$ by a terrestrial object i is expressed as in the following expression (28).

$$z_{land,i} = [\rho_{p,i} \, \theta_{p,i}]^T \quad (28)$$

If N terrestrial objects can be simultaneously observed, an observation equation $z_{land}$ combining together i=1 to N terrestrial object observed values is expressed as in the following expression (29).

$$z_{land} = [\rho_{p,1} \, \theta_{p,1} \, \rho_{p,2} \, \theta_{p,2} \cdots \rho_{p,N} \, \theta_{p,N}]^T \quad (29)$$

An element in which observed values that can be observed in various situations are combined together is referred to as an output vector z. The output vector z has different contents in situations in which the observed value is obtained. z in each of the situations will be described below.

<When Only GNSS Sensor can Observe>

When there are no terrestrial objects around the vehicle and only the observed value by the GNSS sensor 1 is satisfactory, the output vector z is expressed as in the following expression (30).

$$z = [z_{GNSS}^T]^T \quad (30)$$

<When Only Terrestrial Object Detector can Observe>

When reliability of the observed value by the GNSS sensor 1 such as in a city area is low and the terrestrial object can be detected, the output vector z is expressed as in the following expression (31).

$$z = [z_{land}^T]^T \quad (31)$$

<When GNSS Sensor and Terrestrial Object Detector can Observe>

When the observed value of the GNSS sensor 1 is satisfactory and the terrestrial object can be detected, the output vector z is expressed as in the following expression (32).

$$z = [z_{GNSS}^T \, z_{land}^T]^T \quad (32)$$

Note that the output vector z can be expressed as a function of the state vector x and u, and in the above situation, it can all be described as in the following expression (33).

$$z = h_0(x, u) \quad (33)$$

By using the observation equation in a merging manner as in expression (32), positioning calculation and error estimation of the autonomous sensor can be performed with higher reliability. In addition, through the merged use without switching the observation equation as in expression (32), an unpreferable phenomenon such as positioning leaping can be reduced.

By performing Taylor expansion on expression (33) about the pre-estimated value xb of the state vector, it can be expressed by the following expressions (34) and (35).

$$\delta z = \frac{\partial h_0}{\partial x}\bigg|_{x=x_b} \delta x \quad (34)$$

$$\delta z = H \delta x \quad (35)$$

In expression (34), the output vector z is the observation equation expressed in expression (33) shown above.

Further, in expression (35), H is a matrix obtained by performing linear Taylor expansion on the observation equation regarding the state vector x and substituting the pre-estimated value xb as x, and is expressed by the following expression (36).

$$H := \frac{\partial h_0}{\partial x}\bigg|_{x=x_b} \quad (36)$$

Note that the matrix H can be calculated by either calculating analytically or using numerical differentiation.

By discretizing expression (24) and expression (35) with a sampling time Δt of the autonomous sensor 6 and discrete time is represented by k, the expressions can be expressed as the following expression (37) and expression (38), respectively.

$$\delta x_k = F \delta x_{k-1} + w_k \quad (37)$$

$$\delta z_k = H \delta x_k + v_k \quad (38)$$

In expression (37) and expression (38), F is a state transition matrix related to an error state vector $\delta x_k$ related to the time k and is expressed by F=(1+Fa·dt), and is expressed by $w_k = w \cdot \Delta t$. $v_k$ is sensor noise corresponding to each observed value. The process noise w and the sensor noise $v_k$ are parameters of the Kalman filter, and can be set by using pre-measured values or the like.

By applying processing algorithm of the Kalman filter with the use of expression (37) and expression (38), an estimated value $\delta x_{e,k}$ of the error state vector at the discrete time k can be calculated.

<Time Evolution Processing>

Time evolution processing is processing executed at each sampling time of the autonomous sensor 6. A pre-estimated value $x_{b,k}$ of the state vector at the time k is expressed by the following expression (39) by using inertial positioning results $y_{d,k}$ and an autonomous sensor error $e_{sensor,k}$ at the time k.

$$x_{b,k} = [y_{d,k}^T \, e_{sensor,k}^T]^T \quad (39)$$

When a pre-estimated value of the error state vector at the time k is represented by $\delta x_{b,k}$, an error covariance matrix as $P_k$(n×n matrices), and a pre-error covariance matrix as $P_{b,k}$(n×n matrices), the pre-estimated value $\delta x_{b,k}$ and the pre-error covariance matrix $P_{b,k}$ perform time evolution processing as the following expression (40) and expression (41), respectively.

$$\delta x_{b,k} = F \delta x_{b,k-1} \quad (40)$$

$$P_{b,k} = FP_{k-1}F^T + Q \quad (41)$$

In expression (41), Q is a covariance matrix (n×n matrices) of the process noise with the variance of $w_k$ being a diagonal component. Although the initial value of the error covariance matrix is required immediately after power of the vehicle positioning device 20 is turned on or the like, $P_{k-1}$ which is expressed in the following expression (42) with the use of any scalar value α satisfying 0 or greater and n×n unit matrices $I_{n \times n}$ or the like is often used as the initial value. Further, as the initial value of $\delta x_{b,k}$, a vector with all of the elements of $\delta x_{b,k}$ being 0 is used.

$$P_{k-1} = \alpha \cdot I_{n \times n} \quad (42)$$

<Observation Update Processing>

At the time when the observed value by the external sensor is obtained, observation update processing defined by the following expressions (43), (44), and (45) is performed.

$$G_k = P_{b,k} H^T (HP_{b,k} H^T + R)^{-1} \quad (43)$$

[Expression 44]

$$\delta x_{e,k} = \delta x_{b,k} + G_k (\delta z_k - H \delta x_{b,k}) \quad (44)$$

$$P_k = (I_{n \times n} - G_k H) P_{b,k} \quad (45)$$

In expressions (43) to (45), $\delta x_{e,k}$ is an estimated value of the error state vector, R is a covariance matrix (p×p matrices) of the sensor noise, and $G_k$ is a Kalman gain.

Further, $\delta z_k$ is a vector expressed by the following expression (46) with $z_{m,k}$ being an actual observed value at the time k, and $z_{p,k}$ being a predicted observed value.

$$\delta z_k = z_{m,k} - z_{p,k} \quad (46)$$

In this manner, the estimated value $\delta x_{e,k}$ of the error state vector at the time k is calculated, and thus the estimated value $x_{e,k}$ of the state vector $x_k$ can be calculated as the following expression (47).

$$x_{e,k} = x_{b,k} + \delta x_{e,k} \quad (47)$$

Here, $P_k$ represents distribution related to a difference between a true value and an estimated value of the state vector, and by using the value, an abnormal value of the external sensor can be determined. For example, a rejection mechanism as follows can be configured: an ellipse referred to as an error ellipse is obtained by extracting elements for latitude and longitude of $P_k$ and performing specific value analysis results, and if there is a sensor value of the GNSS sensor 1 within the range of the error ellipse, the value is used as the observed value, and if not, the value is not used as the observed value, for example.

With the use of the particle filter, a similar rejection mechanism can be configured as well, and by rejecting the abnormal value, estimation with higher reliability can be performed.

It is preferable that the elements of the covariance matrix R of the sensor noise corresponding to the GNSS sensor 1 be changed according to the positioning state of the GNSS sensor 1, for example, point positioning, DGPS, the Float solution, and the Fix solution.

It is preferable that the elements of the covariance matrix R of the sensor noise corresponding to the terrestrial object observed value be changed according to each of the terrestrial object types, because the elements can be different for each of the terrestrial object types, based on performance of the terrestrial object detector 3.

Here, the description returns back to the flowchart of FIG. 5, and processing of Step S104 will be described. The estimated value $x_{e,k}$ of the state vector obtained in Step S103 is used as a state vector $x_e$, and is defined as in the following expression (48).

$$x_e = [\lambda_e \; \varphi_e \; h_e \; s_{ve} \; s_{\gamma e} \; b_{\gamma e}]^T \quad (48)$$

In expression (48), $\lambda_e$, $\varphi_e$, $h_e$, and $\psi_e$ are respectively estimated values of latitude, longitude, altitude, and azimuth, and $s_{ve}$, $s_{\gamma e}$, and $b_{\gamma e}$ are respectively estimated values of the vehicle speed scale factor, the yaw rate scale factor, and the yaw rate bias.

Based on the assumption of $y_e = [\lambda_e \varphi_e h_e \psi_e]^T$, positioning results $y_{out}$ being output of the vehicle positioning device 20 are expressed by the following expression (49).

$$y_{out} = y_e \quad (49)$$

Further, the autonomous sensor error $e_{sensor}$ is expressed by the following expression (50), and is input to the sensor correction unit 14.

$$e_{sensor} = [s_{ve} \; s_{\gamma e} \; b_{\gamma e}]^T \quad (50)$$

By mounting the vehicle positioning device 20 having the configuration as described above on the vehicle, positioning accuracy can be maintained and situations where positioning can be continued can be increased even in an urban area and its suburban area where multipath is liable to be caused.

Note that, in the present embodiment, results obtained through positioning calculation by the GNSS sensor 1 such as latitude, longitude, altitude, and azimuth are used as the observed value of the GNSS sensor 1. However, the GNSS sensor 1 may be able to output raw data such as the pseudorange observed value, the Doppler observed value, and the carrier wave phase observed value, and in that case, any one or all of these can be used as the observed value. In this case, although a drift and the like of receiver time of the GNSS sensor 1 needs to be added to the state variable and error estimation regarding the receiver time also needs to be performed, the observed value by the GNSS sensor 1 can be generated even when there is only a small number of visible satellites (for example, only one satellite). Such a technology is referred to as tight coupling, and higher-accuracy positioning can be performed by combining with the observed value of the terrestrial object detector 3 as in the present embodiment.

Further, in the present embodiment, a model in which movement in performed roughly within a plane is used as the model of inertial positioning. However, by using three-axis acceleration and angular velocity as the autonomous sensor 6, an inertial positioning model in which the roll angle and the pitch angle of the vehicle vary can be constructed, and thus higher-accuracy positioning and orientation estimation can be performed.

Further, in the present embodiment, as the terrestrial object observed value, the relative distance and the relative angle are used as the observed value. However, depending on processing of terrestrial object detection, it is also conceivable that relative velocity with respect to the terrestrial object is output. In this case, the relative velocity is added to the observed value of the terrestrial object, and thus higher-accuracy positioning can be performed.

Further, in the present embodiment, the estimation method using the extended Kalman filter is illustrated. However, when the noise accompanying the system is not Gaussian distribution, positioning and estimation of the sensor error can be performed with high accuracy by applying the particle filter.

Further, only the positioning results are used as the output of the vehicle positioning device 20. However, a corrected sensor value can also be output.

Second Embodiment

In the first embodiment described above, positioning is performed by using the observed value of the terrestrial object. However, in an urban area and its suburban area where multipath is liable to be caused, positioning calculation and estimation of the sensor correction amount may be performed by performing positioning using line shape information of a road.

Figure 7:
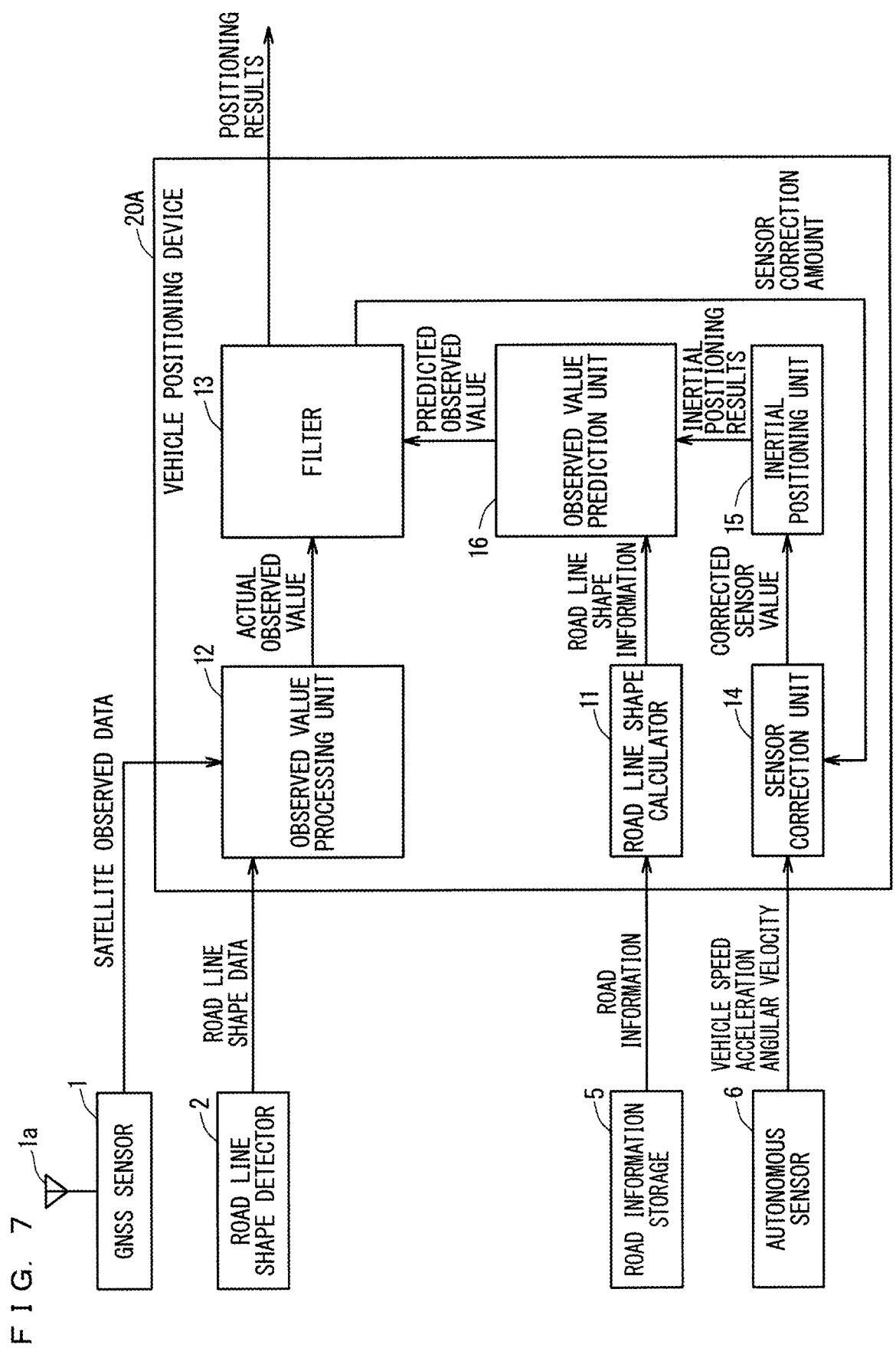
FIG. 7 is a functional block diagram illustrating a configuration of a vehicle positioning device of the second embodiment according to the present invention.

FIG. 7 is a functional block diagram illustrating a configuration of a vehicle positioning device 20A of the second embodiment according to the present invention. Note that, in FIG. 7, configurations the same as those of the vehicle positioning device 20 described with reference to FIG. 1 are denoted by the same reference signs, and overlapping description will be omitted.

As illustrated in FIG. 7, in the vehicle positioning device 20A, road line shape data is received from a road line shape detector 2 (fourth sensor) instead of the terrestrial object detector 3 of the vehicle positioning device 20 illustrated in FIG. 1.

The road line shape detector 2 has a function of detecting a road line shape by using a camera or the like attached to the vehicle and outputting detection results. Usually, the camera is attached to the front side of the vehicle, and right and left mark lines in front of the vehicle are detected through image processing, and are input to the observed value processing unit 12 as the road line shape data.

A road line shape calculator 11 has a function of calculating a road line shape near the vehicle by using road information obtained from a road information storage 5, and outputting the results to the observed value prediction unit 16 as the road line shape information.

<Operation>

Next, an overall processing flow of the vehicle positioning device 20A will be described with reference to the flowchart illustrated in FIG. 8. Note that, in FIG. 8, except for addition of Steps S121 and S122, processing the same as that of the flowchart described with reference to FIG. 5 is denoted by the same reference signs, and overlapping description will be omitted.

When the vehicle positioning device 20A starts positioning, first, the initial value of inertial positioning and the current inertial positioning results used in the observed value prediction unit 16 are acquired (Step S100).

Next, the vehicle positioning device 20A determines whether data is obtained from the external sensors such as the GNSS sensor 1 and the road line shape detector 2 (Step S101). The external sensors have detection targets different from each other. If there is at least one sensor that obtains a sensor value (in a case of Yes), the processing proceeds to Step S102, otherwise (in a case of No), the processing proceeds to Step S131.

If the vehicle positioning device 20A cannot obtain data from the external sensor, in Step S131, the vehicle positioning device 20A outputs inertial positioning results calculated in inertial positioning calculation of Step S113 as positioning results of the vehicle positioning device 20A.

In Step S102, the observed value processing unit 12 processes the sensor value obtained in the external sensor so as to be used by the filter 13 in the next Step S103, and outputs the results as an actual observed value.

Here, processing for the observed value obtained in the road line shape detector 2 in the observed value processing unit 12 will be described. Note that the processing for the observed value obtained in the GNSS sensor 1 is the same as that in the first embodiment, and thus description thereof will be omitted.

<Processing for Observed Value in Road Line Shape Detector>

In the road line shape detector 2, mark lines in the right and left directions of the vehicle can be detected with a camera attached to the front side of the vehicle. In the road line shape detector 2, a cubic coefficient is output as detection results related to the right and left mark lines, and the right mark line and the left mark line are respectively expressed by the following expressions (51) and (52) in the vehicle coordinate system.

[Expression 51]

$$yb = C_{3r} \cdot xb^3 + C_{2r} \cdot xb^2 + C_{1r} \cdot xb^1 + C_{0r} \quad (51)$$

[Expression 52]

$$yb = C_{3l} \cdot xb^3 + C_{2l} \cdot xb^2 + C_{1l} \cdot xb^1 + C_{0l} \quad (52)$$

In the present embodiment, the road line shape at the traffic lane center is used as a representative value. Accordingly, in the observed value processing unit 12, processing expressed by the following expression (53) is performed regarding road line shape calculation results.

$$yb = C_{3c} \cdot xb^3 + C_{2c} \cdot xb^2 + C_{1c} \cdot xb^1 + C_{0c} \quad (53)$$

In expression (53), $C_{3c}=(C_{3r}+C_{3l})/2$, $C_{2c}=(C_{2r}+C_{2l})/2$, $C_{1c}=(C_{1r}+C_{1l})/2$, and $C_{0c}=(C_{0r}+C_{0l})/2$.

In the present embodiment, as the observed value detected in the road line shape detector 2, a horizontal position deviation $y_m$, a deviation angle $\theta_m$, and a curvature $\kappa_m$ at the point of xb=0 are used. Those are calculated by the following expressions (54), (55), and (56), respectively, based on the road line shape of the traffic lane center.

$$y_m = C_{0c} \quad (54)$$

$$\theta_m = \mathrm{atan}(C_{1c}) \quad (55)$$

$$\kappa_m = 2C_{2c} \quad (56)$$

Figure 9:
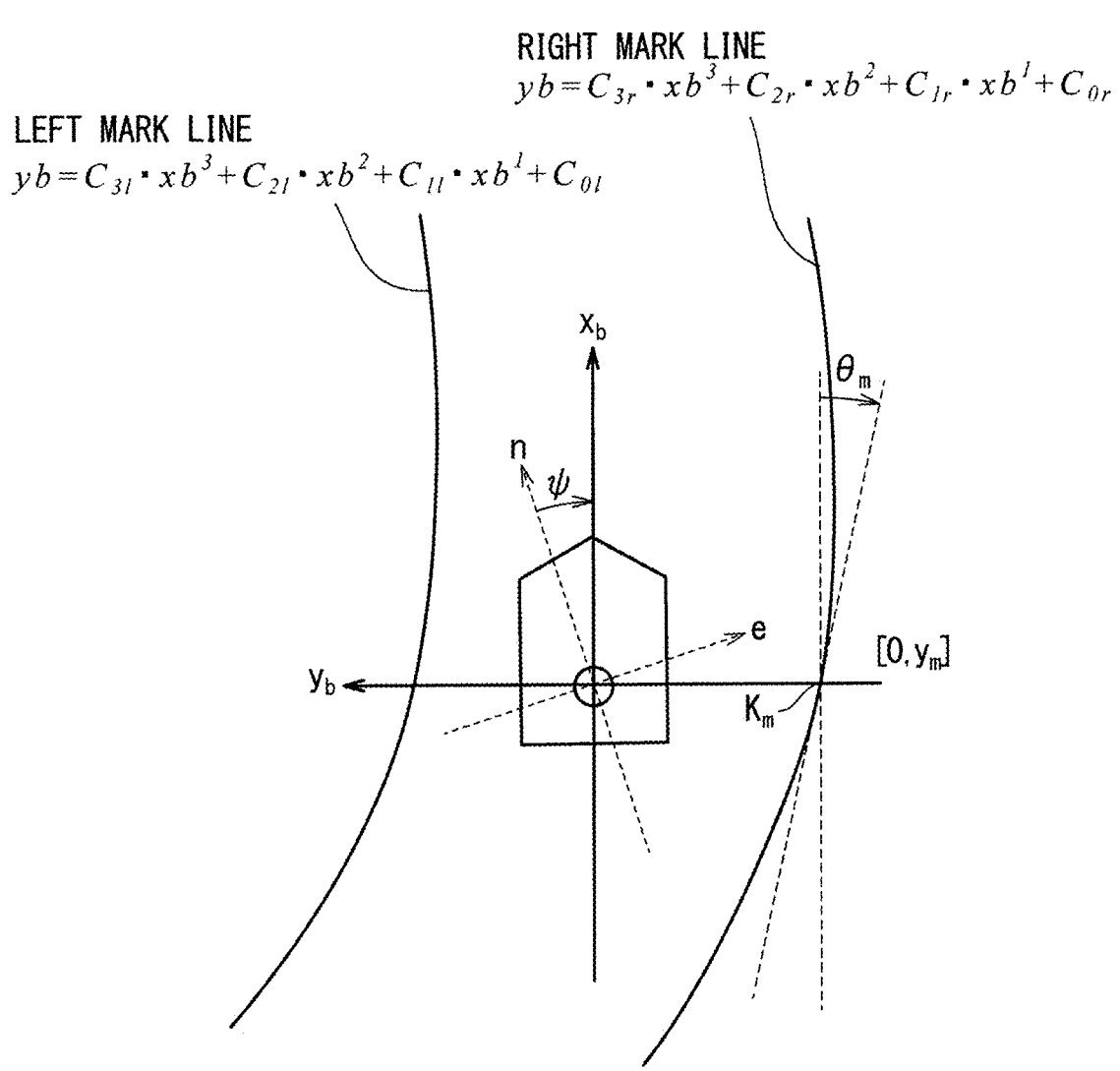
FIG. 9 is a diagram illustrating a road line shape.

FIG. 9 is a diagram illustrating the road line shape, illustrates definition of the horizontal position deviation $y_m$, the deviation angle $\theta_m$, and the curvature $\kappa_m$, and shows the position of the vehicle OV with the vehicle navigation coordinate system and the NED coordinate system. Further, the right mark line expressed by expression (51) and the left mark line expressed by expression (52) are schematically illustrated.

<Processing in Road Line Shape Calculator>

Here, the description returns back to the flowchart of FIG. 8, and Step S121 will be described. The vehicle positioning device 20A acquires road information around the vehicle from the road information storage 5 in parallel with Step S101 and Step S111 (Step S121). As illustrated in FIG. 3, the road information storage 5 stores information related to the really existing terrestrial object and the imaginary terrestrial object on a road in a zone where map data is prepared, and stores, as the information related to the imaginary terrestrial object, information of a roadway link, a traffic lane link, a node on the traffic lane link, a hatched region, and the like. In addition, information of the traffic lane width of the traffic lane, vertical and horizontal inclinations, and the like may be included.

After acquiring the road information in Step S121, the processing proceeds to Step S122. In Step S122, in the road line shape calculator 11, the road line shape information around the vehicle that is to be used later in the observed value prediction unit 16 is calculated. In the present embodiment, absolute position coordinates of the traffic lane center are stored in the road information storage 5 as a map node, and a method of calculating the road line shape by using the information will be described below.

Figure 10:
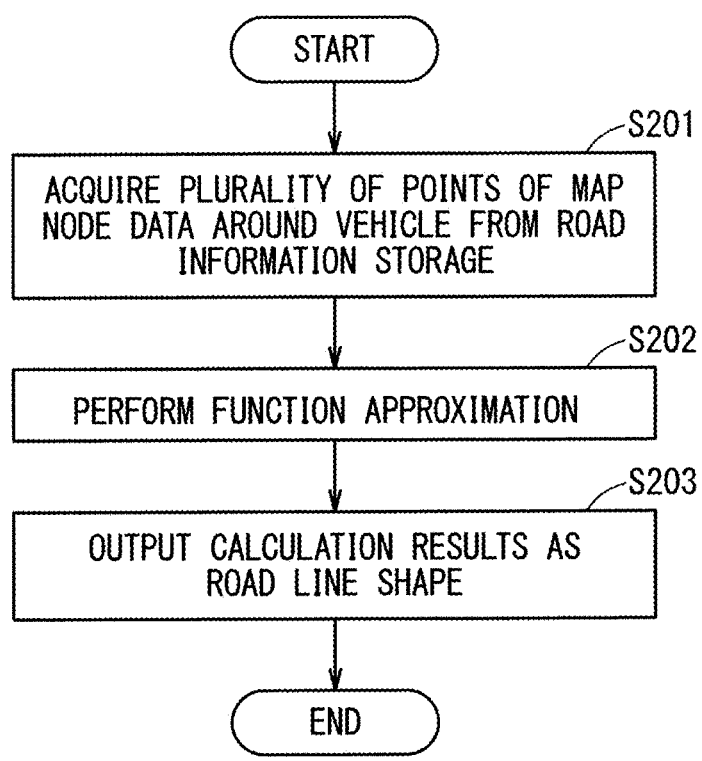
FIG. 10 is a flowchart illustrating calculation processing of the road line shape.

FIG. 10 is a flowchart illustrating the processing in Step S122. The processing of Step S122 will be described below with reference to FIG. 10.

First, in Step S201, map node data is acquired from the road information storage 5. Here, absolute position coordinates of the traffic lane center at which the vehicle is located as map node data are obtained as latitude, longitude, and altitude. The map node data of a plurality of points around the vehicle is hereinafter referred to as a map point group.

Next, in Step S202, function approximation is performed on the map point group obtained in Step S201. Specifically, first, the map point group is expressed as a line that passes through each node from the node at the start position to the node at the end position, and the road line shape is calculated based on the obtained line. Specifically, the road point group is expressed as the road line shape by using a line length parameter s, where s at the start position node satisfies s=0 and s at the end point node satisfies s=1. s at each node position can be calculated based on the latitude, longitude, and altitude of the map node data, and thus through interpolation processing such as the function approximation, absolute position coordinates of the latitude, longitude, and altitude at each node of the map point group can be expressed as a line using s. Examples of a method of function approximation include methods using the Bezier curve, the spline curve, and the like. In the present embodiment, a method of performing approximation with a cubic polynomial will be described.

Figure 11:
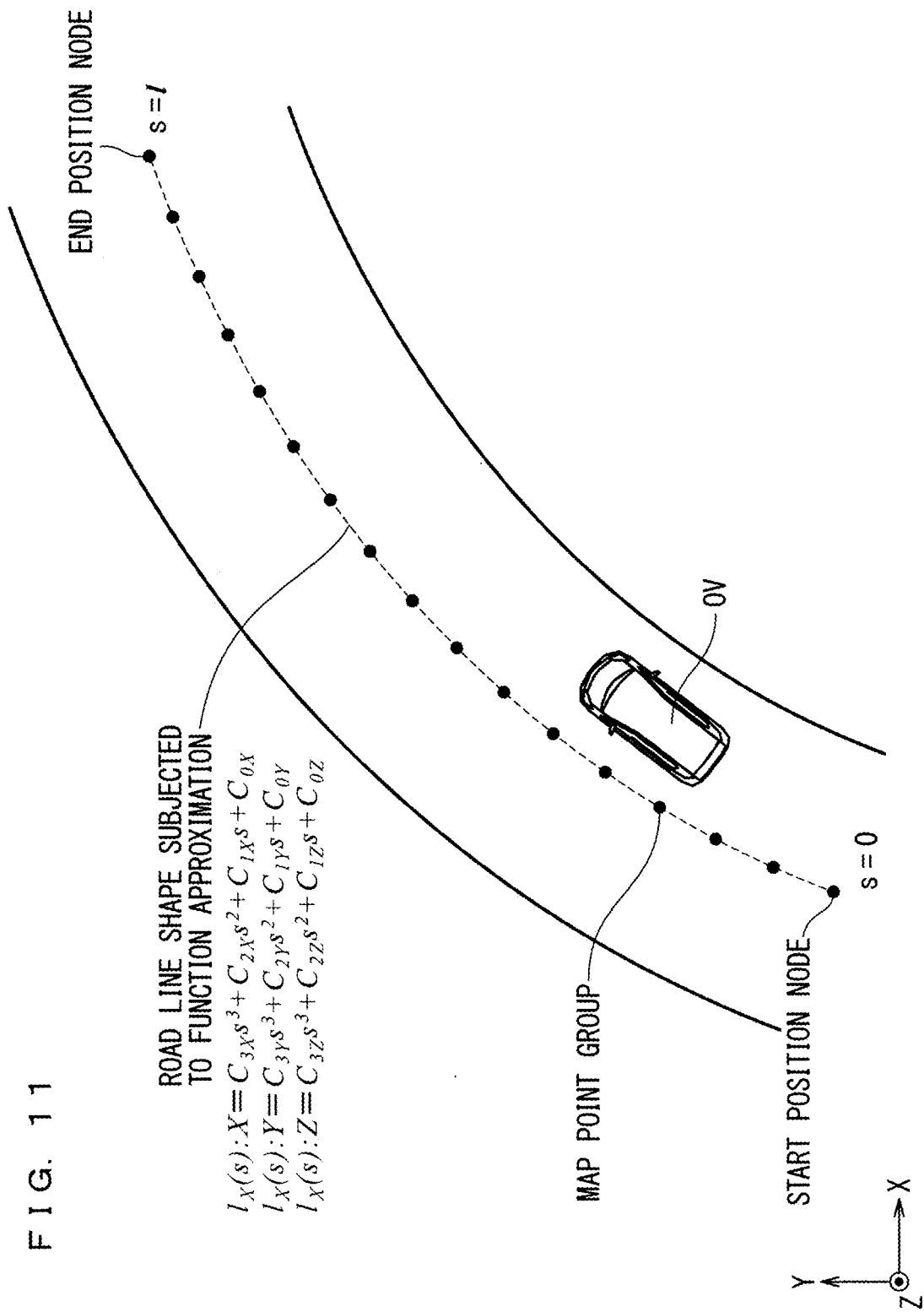
FIG. 11 is a conceptual diagram illustrating the road line shape.

FIG. 11 illustrates a conceptual diagram of the map point group, and the road line shape subjected to function approximation. If the map point group subjected to function approximation, specifically, the absolute position coordinates of the road center, are expressed with functions $l_X(s)$, $l_Y(s)$, and $l_Z(s)$ in ECEF coordinates (X, Y, Z), those can be expressed with a cubic polynomial as in the following expressions (57), (58), and (59), respectively.

$$l_X(s): X = C_{3X}s^3 + C_{2X}s^2 + C_{1X}s + C_{0X} \quad (57)$$

$$l_Y(s): Y = C_{3Y}s^3 + C_{2Y}s^2 + C_{1Y}s + C_{0Y} \quad (58)$$

$$l_Z(s): Z = C_{3Z}s^3 + C_{2Z}s^2 + C_{1Z}s + C_{0Z} \quad (59)$$

Note that, as another method of calculating the road line shape, there is a method of calculating the road line shape based on traffic lane link and node information, and for example, the technology disclosed in Japanese Patent Application Laid-Open No. 2005-313803 can be used.

Next, in Step S203, as the road line shape obtained in Step S202, a cubic approximation coefficient is output as calculation results.

The information of the road line shape calculated in Step S122 is given to the observed value prediction unit 16, and processing of Step S114 is performed. Specifically, in Step S114, the predicted observed value is calculated by using the inertial positioning results obtained in the inertial positioning unit 15 and the road line shape information obtained in the road line shape calculator 11. Note that prediction for the observed value of the GNSS sensor 1 is the same as that in the first embodiment, and thus prediction for the observed value of the road line shape detector 2 will be described below.

<Processing in Observed Value Prediction Unit>
<Prediction for Observed Value of Road Line Shape Detector>

The observed value obtained in the road line shape detector 2 is the horizontal position deviation, the deviation angle, and the curvature. The horizontal position deviation, the deviation angle, and the curvature can be predicted based on the inertial positioning results and the road line shape around the vehicle obtained by the road line shape calculator 11. Specifically, as illustrated in FIG. 9, the road line shape $(l_X(s), l_Y(s), l_Z(s))$ obtained in the road line shape detector 2 is converted into a road line shape $(l_{nX}(s), l_{nY}(s), l_{nZ}(s))$ expressed in the vehicle navigation coordinate system by using coordinate conversion. Specifically, those are expressed as $xb=l_{nX}(s)$, $yb=l_{nY}(s)$, and $zb=l_{nZ}(s)$. In addition, s that satisfies xb=0 is analytically or numerically calculated. When s in this case is represented by sc, the predicted horizontal position deviation, deviation angle, and curvature are respectively calculated as in the following expressions (60), (61), and (62). These can be either calculated analytically or calculated by using numerical calculation.

$$y_p = l_{nY}|_{s=s_c} \quad (60)$$

$$\theta_p = \operatorname{atan}\left(\frac{dy_b}{dx_b}\bigg|_{s=s_c}\right) \quad (61)$$

$$\kappa_p = \frac{\frac{d^2 y_b}{dx_b^2}}{\left\{1+\left(\frac{dy_b}{dx_b}\right)^2\right\}^{\frac{3}{2}}}\bigg|_{s=s_c} \quad (62)$$

<Processing in Filter>

Here, the description returns back to the flowchart of FIG. 8, and processing of Step S103 will be described. In the filter 13, filter positioning calculation and estimation of errors of the autonomous sensor 6 are performed by using the actual observed value obtained in Step S102 and the predicted observed value obtained in Step S114. The difference from the first embodiment is the observation equation.

An observation equation $z_{road}$ by the road line shape is expressed as in the following expression (63).

$$z_{road} = [y_p \ \theta_p \ \kappa_p]^T \quad (63)$$

<When Only GNSS Sensor can Observe>

When the road line shape cannot be detected and the observed value by the GNSS sensor 1 is satisfactory, the output vector z is expressed as in the following expression (64).

$$z = [z_{GNSS}^T]^T \quad (64)$$

<When Only Road Line Shape Detector can Observe>

When reliability of the observed value by the GNSS sensor 1 such as in a city area is low and the road line shape can be detected, the output vector z is expressed as in the following expression (65).

$$z = [z_{road}^T]^T \quad (65)$$

<When GNSS Sensor and Road Line Shape Detector can Observe>

When the observed value of the GNSS sensor 1 is satisfactory and the road line shape can be detected, the output vector z is expressed as in the following expression (66).

$$z = [z_{GNSS}^T \ z_{road}^T]^T \quad (66)$$

By performing processing similar to the first embodiment in each of the situations, positioning calculation and estimation of the correction amount of the autonomous sensor can be performed.

Further, in the above, the point of xb=0 is used as the observed value of the road line shape. However, as xb, any point may be selected. In addition, a plurality of points may be used, instead of only one point as with the case of xb=0. For example, the point of xb=0 and a point of xb=10 may be simultaneously used. In this case, the number of observed values related to the road line shape is increased, and thus higher-accuracy positioning can be performed.

Further, the horizontal position deviation, the deviation angle, and the curvature are used as the observed value by the road line shape. However, when the observed value of the road line shape is subjected to curve approximation with a higher degree, a curvature change or the like can also be added as the observed value. In this case, the number of observed values is increased, and thus higher-accuracy positioning can be performed.

As described above, by using the road line shape detector 2 and the road information storage 5, positioning calculation and estimation of the sensor correction amount can be performed. According to the configuration as described above, situations where positioning can be continued can be increased, similarly to the case using the terrestrial object.

Third Embodiment

Positioning may be performed by using the observed value of the terrestrial object and the line shape information of the road by combining the first embodiment and the second embodiment described above.

<Device Configuration>

Figure 12:
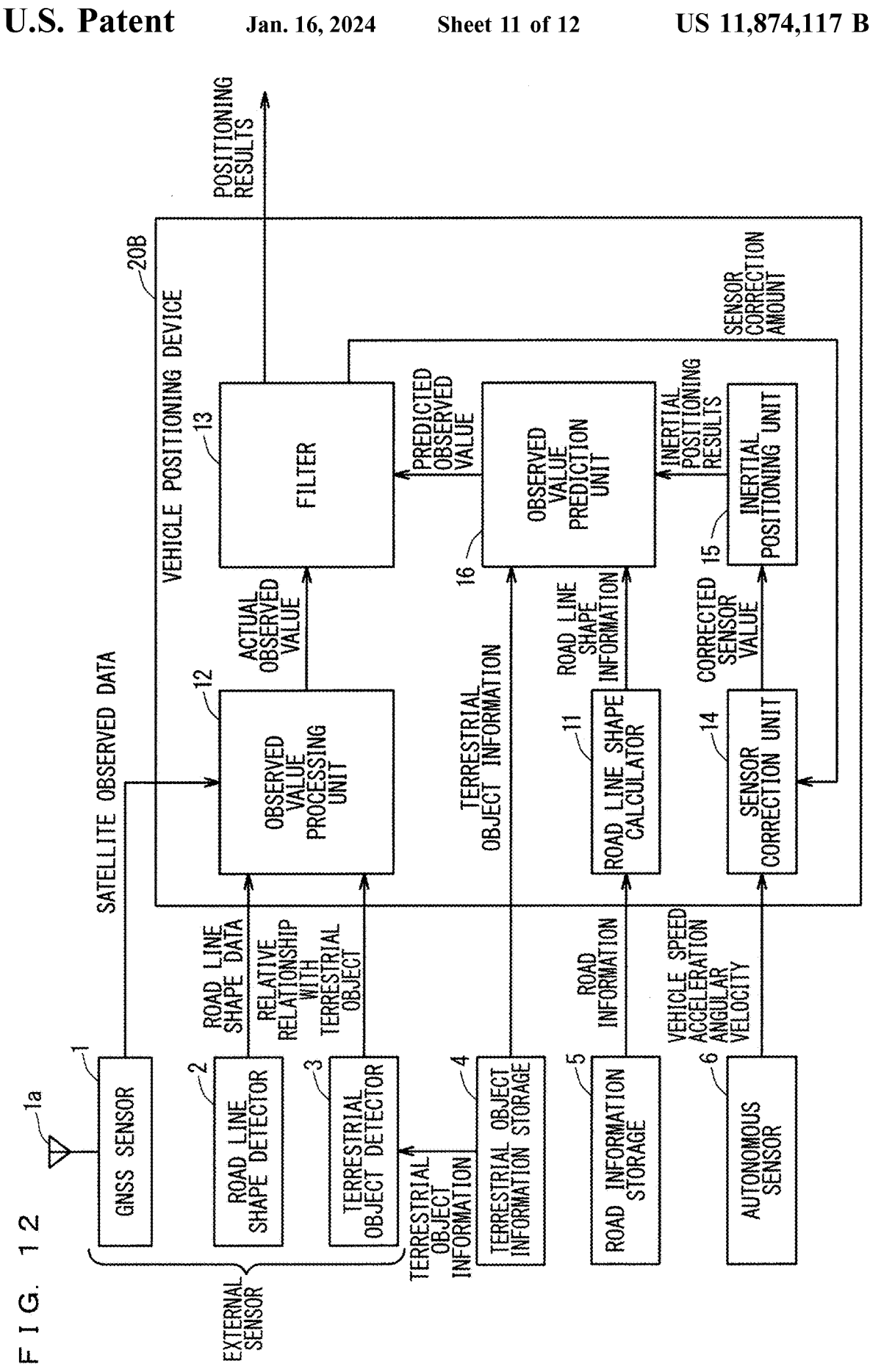
FIG. 12 is a functional block diagram illustrating a configuration of a vehicle positioning device of the third embodiment according to the present invention.

FIG. 12 is a functional block diagram illustrating a configuration of a vehicle positioning device 20B of the third embodiment according to the present invention. Note that, in FIG. 12, configurations the same as those of the vehicle positioning devices 20 and 20A described with reference to FIG. 1 and FIG. 7 are denoted by the same reference signs, and overlapping description will be omitted.

As illustrated in FIG. 12, in the vehicle positioning device 20B, the road line shape data is received from the road line shape detector 2, and data of a terrestrial object information relative relationship is received from the terrestrial object detector 3.

<Operation>

Figure 8:
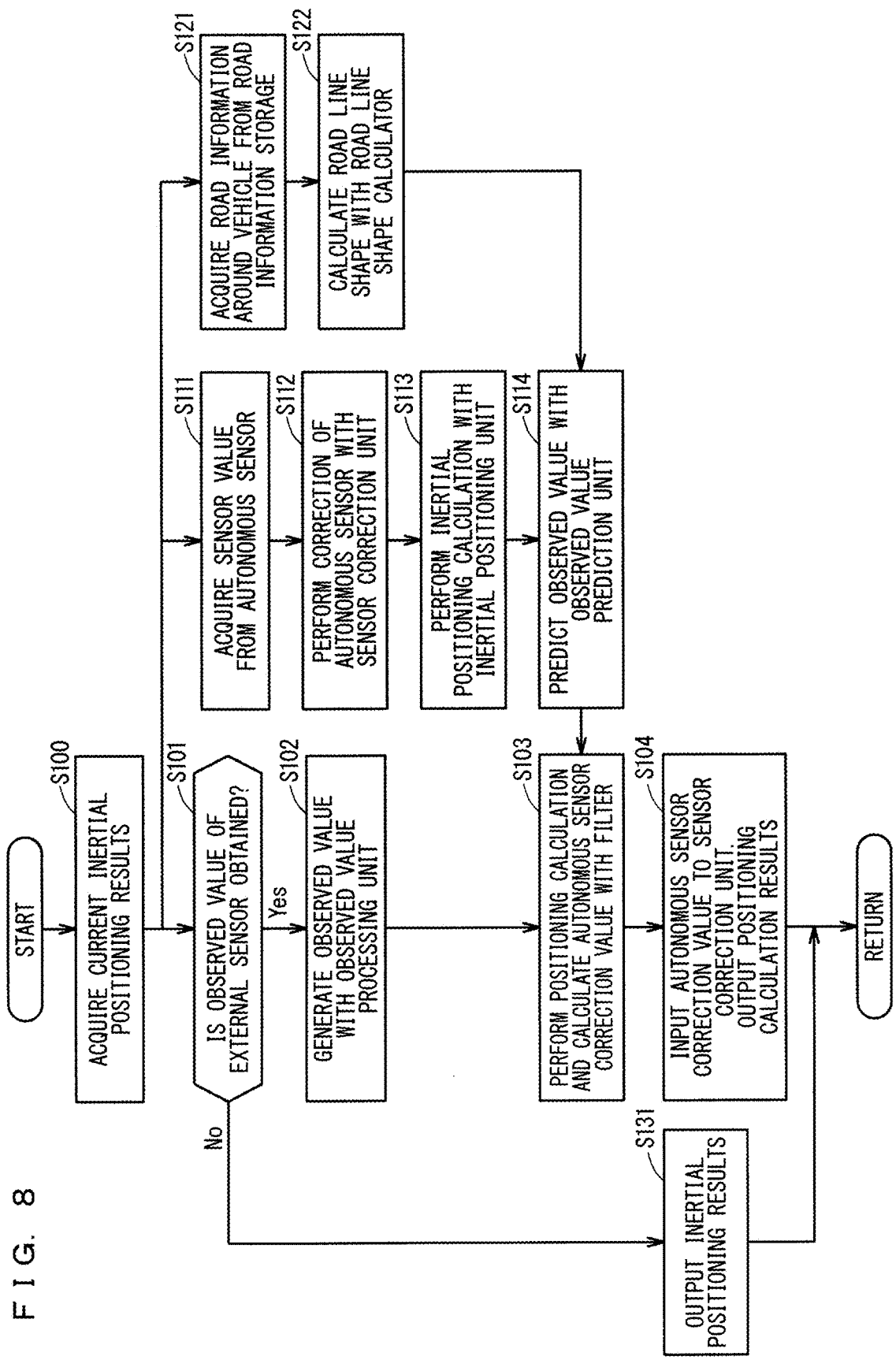
FIG. 8 is a flowchart illustrating an overall processing flow of the vehicle positioning device of the second embodiment according to the present invention.

An overall processing flow of the vehicle positioning device 20B is similar to that of FIG. 8, and thus FIG. 8 is referred to and description of only the difference from the first and second embodiments is provided.

When the vehicle positioning device 20B starts positioning, first, the initial value of inertial positioning and the current inertial positioning results used in the observed value prediction unit 16 are acquired (Step S100).

Next, the vehicle positioning device 20B determines whether data is obtained from the external sensors such as the GNSS sensor 1, the road line shape detector 2, and the terrestrial object detector 3 (Step S101). The external sensors have detection targets different from each other. If there is at least one sensor that obtains a sensor value (in a case of Yes), the processing proceeds to Step S102, otherwise (in a case of No), the processing proceeds to Step S131.

If the vehicle positioning device 20B cannot obtain data from the external sensor, in Step S131, the vehicle positioning device 20B outputs inertial positioning results calculated in inertial positioning calculation of Step S113 as positioning results of the vehicle positioning device 20B.

In Step S102, the observed value processing unit 12 processes the sensor value obtained in the external sensor so as to be used by the filter 13 in the next Step S103, and outputs the results as an actual observed value.

Here, processing on the observed value obtained in each of the GNSS sensor 1 and the terrestrial object detector 3 in the observed value processing unit 12 will be described.

<Processing in Filter>

Here, the description returns back to the flowchart of FIG. 8, and processing of Step S103 will be described. In the filter 13, filter positioning calculation and estimation of errors of the autonomous sensor 6 are performed by using the actual observed value obtained in Step S102 and the predicted observed value obtained in Step S114. The difference from the first and second embodiments is the observation equation. The observation equation in the filter 13 can be expressed as follows depending on each of the situations.

<When Only GNSS Sensor can Observe>

When there are no terrestrial objects around the vehicle, the road line shape cannot be detected, and only the observed value by the GNSS sensor 1 is satisfactory, the output vector z is expressed as in the following expression (67).

$$z=[z_{GNSS}{}^T]^T \tag{67}$$

<When Only Terrestrial Object Detector can Observe>

When reliability of the observed value by the GNSS sensor 1 such as in a city area is low and only the terrestrial object can be detected, the output vector z is expressed as in the following expression (68).

$$z=[z_{land}{}^T]^T \tag{68}$$

<When Only Road Line Shape Detector can Observe>

When there are no terrestrial objects around the vehicle, reliability of the observed value by the GNSS sensor 1 such as in a city area is low, and only the road line shape can be detected, the output vector z is expressed as in the following expression (69).

$$z=[z_{road}{}^T]^T \tag{69}$$

<When GNSS Sensor and Terrestrial Object Detector can Observe>

When the road line shape cannot be detected, the observed value of the GNSS sensor 1 is satisfactory, and the terrestrial object can be detected, the output vector z is expressed as in the following expression (70).

$$z=[z_{GNSS}{}^T\ z_{land}{}^T]^T \tag{70}$$

<When GNSS Sensor and Road Line Shape Detector can Observe>

When there are no terrestrial objects around the vehicle, the observed value of the GNSS sensor 1 is satisfactory, and the road line shape can be detected, the output vector z is expressed as in the following expression (71).

$$z=[z_{GNSS}{}^T\ z_{road}{}^T]^T \tag{71}$$

<When Terrestrial Object Detector and Road Line Shape Detector can Observe>

When reliability of the observed value by the GNSS sensor 1 such as in a city area is low and the road line shape and the terrestrial object can be detected, the output vector z is expressed as in the following expression (72).

$$z=[z_{road}{}^T\ z_{land}{}^T]^T \tag{72}$$

<When GNSS Sensor, Road Line Shape Detector, and Terrestrial Object Detector can Observe>

When the observed value of the GNSS sensor 1 is satisfactory and the road line shape and the terrestrial object can be detected, the output vector z is expressed as in the following expression (73).

$$z = [z_{GNSS}^T \; z_{road}^T \; z_{land}^T]^T \tag{73}$$

By using the observation equation corresponding to each situation described above, filter positioning calculation and estimation of the error of the autonomous sensor 6 can be performed in the filter 13.

As described above, by using the road line shape detector 2, the terrestrial object detector 3, the terrestrial object information storage 4, and the road information storage 5, positioning calculation and estimation of the sensor correction amount can be performed. According to the configuration as described above, the vehicle positioning device can be implemented, with situations where positioning can be continued being increased and positioning leaping or the like being reduced.

<Hardware Configuration>

Figure 13:
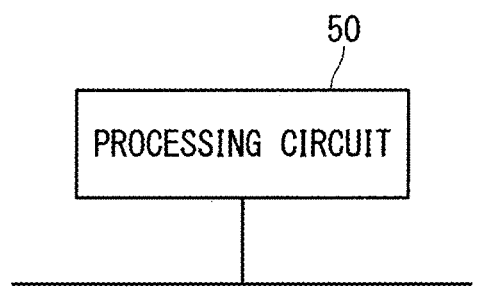
FIG. 13 is a diagram illustrating a hardware configuration for implementing the vehicle positioning device of the first to third embodiments according to the present invention.

Note that each component of the vehicle positioning devices 20, 20A, and 20B of the first to third embodiments described above can be configured using a computer, and is executed by the computer executing a program. Specifically, the vehicle positioning devices 20 to 20B are implemented by a processing circuit 50 illustrated in FIG. 13, for example. A processor such as a CPU and a digital signal processor (DSP) is applied to the processing circuit 50, and the function of each unit is implemented by executing a program stored in a storage device.

Note that, as the processing circuit 50, dedicated hardware may be applied. If the processing circuit 50 is dedicated hardware, examples of the processing circuit 50 include a single circuit, a composite circuit, a programmed processor, a processor for parallel programming, an application specific integrated circuit (ASIC), a field-programmable gate array (FPGA), a combination of these, and the like.

Regarding the vehicle positioning devices 20 to 20B, the function of each of the components may be implemented by an individual processing circuit, or the functions may be collectively implemented by one processing circuit.

Figure 14:
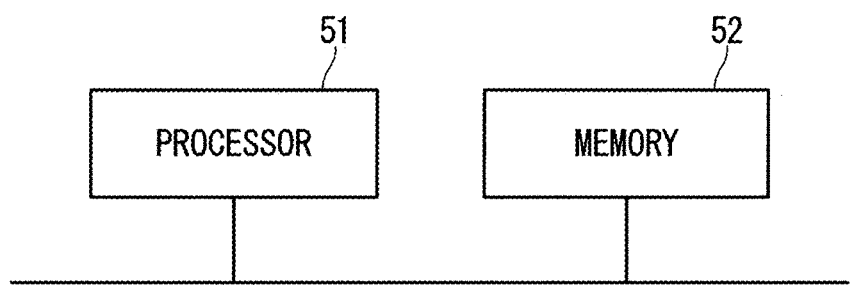
FIG. 14 is a diagram illustrating a hardware configuration for implementing the vehicle positioning device of the first to third embodiments according to the present invention.

Further, FIG. 14 illustrates a hardware configuration when the processing circuit 50 is configured using a processor. In this case, the function of each unit of the vehicle positioning devices 20 to 20B is implemented by a combination with software or the like (software, firmware, or software and firmware). The software or the like is described as a program, and is stored in a memory 52. A processor 51 that functions as the processing circuit 50 implements the function of each unit by reading and executing the program stored in the memory 52 (storage device). Specifically, it can be said that the program causes the computer to execute procedures and methods of operations of the components of the vehicle positioning devices 20 to 20B.

Here, examples of the memory 52 may include a nonvolatile or volatile semiconductor memory, such as RAM, ROM, flash memory, erasable programmable read only memory (EPROM), and electrically erasable programmable read only memory (EEPROM), a hard disk drive (HDD), a magnetic disk, a flexible disk, an optical disc, a compact disc, a MiniDisc, a digital versatile disc (DVD), a drive device thereof, and any storage medium that may be used ahead.

The above has described a configuration in which the function of each component of the vehicle positioning devices 20 to 20B is implemented by any one of hardware and software or the like. However, this is not restrictive, and a part of the components of the vehicle positioning devices 20 to 20B may be implemented by dedicated hardware, and another part of the components may be implemented by software or the like. For example, the functions of the part of the components can be implemented by the processing circuit 50 as dedicated hardware, and the functions of the another part of the components can be implemented by the processing circuit 50 as the processor 51 reading and executing the program stored in the memory 52.

As described above, the vehicle positioning devices 20 to 20B can implement each function described above with hardware, software or the like, or a combination of these.

While the invention has been shown and described in detail, the foregoing description is in all aspects illustrative and not restrictive. It is therefore understood that numerous unillustrated modifications can be devised without departing from the scope of the present invention.

Note that, in the present invention, each embodiment can be freely combined, and each embodiment can be modified or omitted as appropriate within the scope of the invention.

The invention claimed is:

1. A vehicle positioning device being mounted on a vehicle and positioning a position of the vehicle, the vehicle positioning device being connected to a first sensor outputting satellite positioning data, and a second sensor detecting a state amount of the vehicle and outputting the state amount as state amount data, and being connected to at least one of a third sensor detecting a terrestrial object and outputting data of a relative relationship between the terrestrial object and the vehicle, and a fourth sensor detecting a road line shape and outputting road line shape data, the vehicle positioning device comprising:

observed value processing circuitry configured to receive the satellite positioning data and at least one of the data of the relative relationship and the road line shape data, and generate an actual observed value by integrating the received pieces of data;

sensor correction circuitry configured to correct a sensor error included in the state amount data, the sensor correction circuitry being connected to the second sensor;

inertial positioning circuitry configured to perform inertial positioning by using a corrected sensor value corrected in the sensor correction circuitry and output results as inertial positioning results;

observed value prediction circuitry configured to predict an observed value by using at least the inertial positioning results and output the observed value as a predicted observed value; and a filter configured to perform positioning calculation by using the predicted observed value and the actual observed value and output results as positioning results, and estimate the sensor error and output the sensor error as a sensor correction amount, wherein the filter feeds back the sensor correction amount to the sensor correction circuitry, and the sensor correction circuitry corrects the sensor error by using the sensor correction amount.

2. The vehicle positioning device according to claim 1, wherein the vehicle positioning device is connected to the first, second, and third sensors, and is connected to a terrestrial object information storage storing terrestrial object information, the third sensor calculates the data of the relative relationship by using terrestrial object detection results obtained through detection of the terrestrial object and the terrestrial object information stored in the terrestrial object information storage, the observed value processing circuitry generates the actual observed value by integrating the satellite positioning data and the data of the relative relationship, and the observed value prediction circuitry calculates the predicted observed value by using the inertial positioning results and the terrestrial object information stored in the terrestrial object information storage.

3. The vehicle positioning device according to claim 2, wherein the terrestrial object information storage stores information of an absolute position and a terrestrial object type related to the terrestrial object really existing around a road as the terrestrial object information, and the third sensor calculates the data of the relative relationship with the vehicle, based on the absolute position of the detected terrestrial object, and outputs the data in association with the terrestrial object.

4. The vehicle positioning device according to claim 1, wherein the vehicle positioning device is connected to the first, second, and fourth sensors, and is connected to a road information storage storing road information, the vehicle positioning device further comprises a road line shape calculator configured to calculate a road line shape used in calculation of the predicted observed value in the observed value prediction circuitry, the road line shape calculator calculates the road line shape by using the road information stored in the road information storage, the observed value processing circuitry generates the actual observed value by integrating the satellite positioning data and the road line shape data, and the observed value prediction circuitry calculates the predicted observed value by using the inertial positioning results and the road line shape calculated in the road line shape calculator.

5. The vehicle positioning device according to claim 4, wherein the road information storage includes, as the road information, a roadway link, a traffic lane link, a node on the traffic lane link, and a traffic lane region, and the road line shape calculator uses at least one of the roadway link, the traffic lane link, the node on the traffic lane link, and the traffic lane region for calculation of the road line shape.

6. The vehicle positioning device according to claim 1, wherein the vehicle positioning device is connected to the first, second, third, and fourth sensors, and is connected to a terrestrial object information storage storing terrestrial object information and a road information storage storing road information, the vehicle positioning device further comprises a road line shape calculator configured to calculate a road line shape used in calculation of the predicted observed value in the observed value prediction circuitry, the third sensor calculates the data of the relative relationship by using terrestrial object detection results obtained through detection of the terrestrial object and the terrestrial object information stored in the terrestrial object information storage, the observed value processing circuitry generates the actual observed value by integrating the satellite positioning data, the data of the relative relationship, and the road line shape data, and the observed value prediction circuitry calculates the predicted observed value by using the inertial positioning results, the terrestrial object information stored in the terrestrial object information storage, and the road line shape calculated in the road line shape calculator.

7. The vehicle positioning device according to claim 6, wherein the terrestrial object information storage stores information of an absolute position and a terrestrial object type related to the terrestrial object really existing around a road as the terrestrial object information, and the third sensor calculates the data of the relative relationship with the vehicle, based on the absolute position of the detected terrestrial object, and outputs the data in association with the terrestrial object.

8. The vehicle positioning device according to claim 6, wherein the road information storage includes, as the road information, a roadway link, a traffic lane link, a node on the traffic lane link, and a traffic lane region, and the road line shape calculator uses at least one of the roadway link, the traffic lane link, the node on the traffic lane link, and the traffic lane region for calculation of the road line shape.

9. The vehicle positioning device according to claim 1, wherein when data is not output from the first, third, and fourth sensors, the filter outputs the inertial positioning results output from the sensor correction circuitry as the positioning results.

10. The vehicle positioning device according to claim 1, wherein the first sensor includes, as the observed value, a pseudorange observed value, a Doppler observed value, and a carrier wave phase observed value, and the observed value processing circuitry uses at least one of the pseudorange observed value, the Doppler observed value, and the carrier wave phase observed value for generation of the actual observed value.

11. The vehicle positioning device according to claim 10, wherein the observed value prediction circuitry predicts, as the predicted observed value, at least one of the pseudorange observed value, the Doppler observed value, and the carrier wave phase observed value.

12. The vehicle positioning device according to claim 1, wherein the third sensor includes, as the observed value, a relative distance, a relative velocity, and a relative angle with respect to the terrestrial object, and the observed value processing circuitry uses at least one of the relative distance, the relative velocity, and the relative angle for generation of the actual observed value.

13. The vehicle positioning device according to claim 1, wherein the fourth sensor includes, as the observed value, a horizontal position deviation, a deviation angle, a curvature, and a curvature change, and the observed value processing circuitry uses at least one of the horizontal position deviation, the deviation angle, the curvature, and the curvature change for generation of the actual observed value.

14. The vehicle positioning device according to claim 1, wherein
the filter performs the positioning calculation by using the predicted observed value and the actual observed value, calculates probability distribution of the state amount data output by the second sensor, and estimates the sensor error, based on the state amount being most likely.

* * * * *